US 12,451,673 B2

(12) United States Patent
Soverns et al.

(10) Patent No.: US 12,451,673 B2
(45) Date of Patent: Oct. 21, 2025

(54) PLATFORM MICROGRID

(71) Applicant: GO ELECTRIC, INC., Anderson, IN (US)

(72) Inventors: Robert A. Soverns, Pendleton, IN (US); Alex S. Creviston, Muncie, IN (US)

(73) Assignee: GO ELECTRIC INC., Anderson, IN (US)

( * ) Notice: Subject to any disclaimer, the term of this patent is extended or adjusted under 35 U.S.C. 154(b) by 742 days.

(21) Appl. No.: 17/827,411

(22) Filed: May 27, 2022

(65) Prior Publication Data

US 2022/0385046 A1 Dec. 1, 2022

Related U.S. Application Data

(60) Provisional application No. 63/194,964, filed on May 29, 2021.

(51) Int. Cl.
| | |
|---|---|
| *B60L 53/30* | (2019.01) |
| *H02B 1/01* | (2006.01) |
| *H02B 5/00* | (2006.01) |
| *H02S 40/32* | (2014.01) |
| *B60L 53/51* | (2019.01) |
| *H02S 20/23* | (2014.01) |

(52) U.S. Cl.
CPC ............... *H02B 5/00* (2013.01); *H02B 1/011* (2013.01); *H02S 40/32* (2014.12); *B60L 53/30* (2019.02); *B60L 53/51* (2019.02); *H02S 20/23* (2014.12)

(58) Field of Classification Search
None
See application file for complete search history.

(56) References Cited

U.S. PATENT DOCUMENTS

| 5,816,423 | A | 10/1998 | Fenton et al. | |
|---|---|---|---|---|
| 2012/0261986 | A1* | 10/2012 | Ichikawa | H02J 3/381 |
| | | | | 307/24 |
| 2015/0244307 | A1* | 8/2015 | Cameron | E04B 7/18 |
| | | | | 52/173.3 |
| 2017/0201077 | A1 | 7/2017 | Hafner et al. | |
| 2017/0331325 | A1 | 11/2017 | Ristau | |
| 2019/0044335 | A1 | 2/2019 | Soverns et al. | |
| 2019/0386581 | A1 | 12/2019 | Soverns et al. | |

FOREIGN PATENT DOCUMENTS

| CN | 102025155 A | 4/2011 |
|---|---|---|
| WO | 2002/27892 A1 | 4/2020 |
| WO | 2020/097255 A1 | 5/2020 |

OTHER PUBLICATIONS

Notification Concerning Transmittal of International Preliminary Report on Patentability and International Preliminary Report on Patentability for PCT/US2022/031410, dated Nov. 21, 2023.
International Search Report and Written Opinion corresponding to PCT/US2022/31410 dated Sep. 8, 2022.

* cited by examiner

*Primary Examiner* — Arun C Williams
(74) *Attorney, Agent, or Firm* — Barnes & Thornburg LLP; Steven D. Shipe

(57) ABSTRACT

Devices, systems, and methods for platform microgrids can include a platform skid for mounting of microgrid system equipment, and a microgrid operations system. The platform skid illustratively comprises an intermodal container housing a power storage device in communication to provide power to the power delivery system.

27 Claims, 16 Drawing Sheets

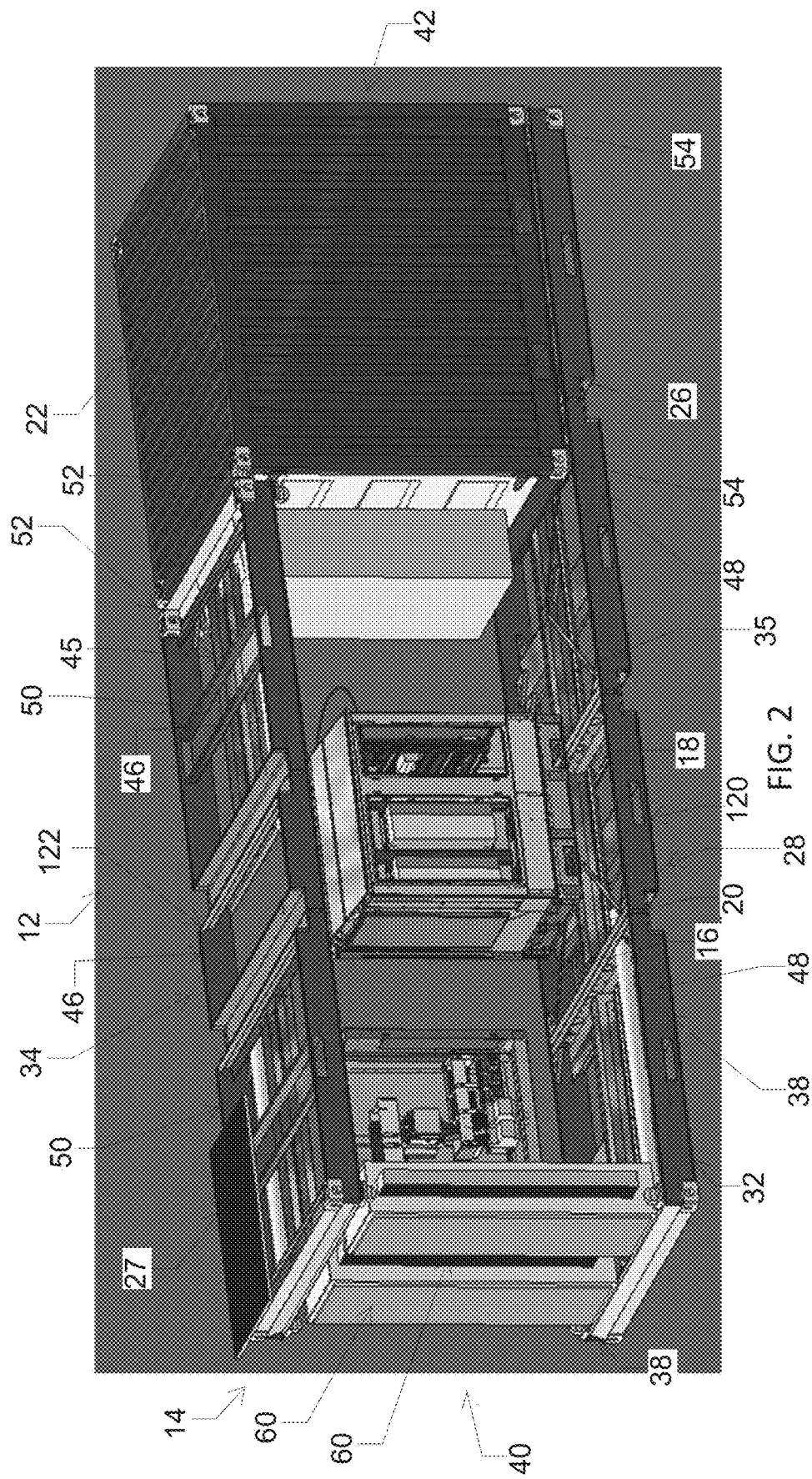

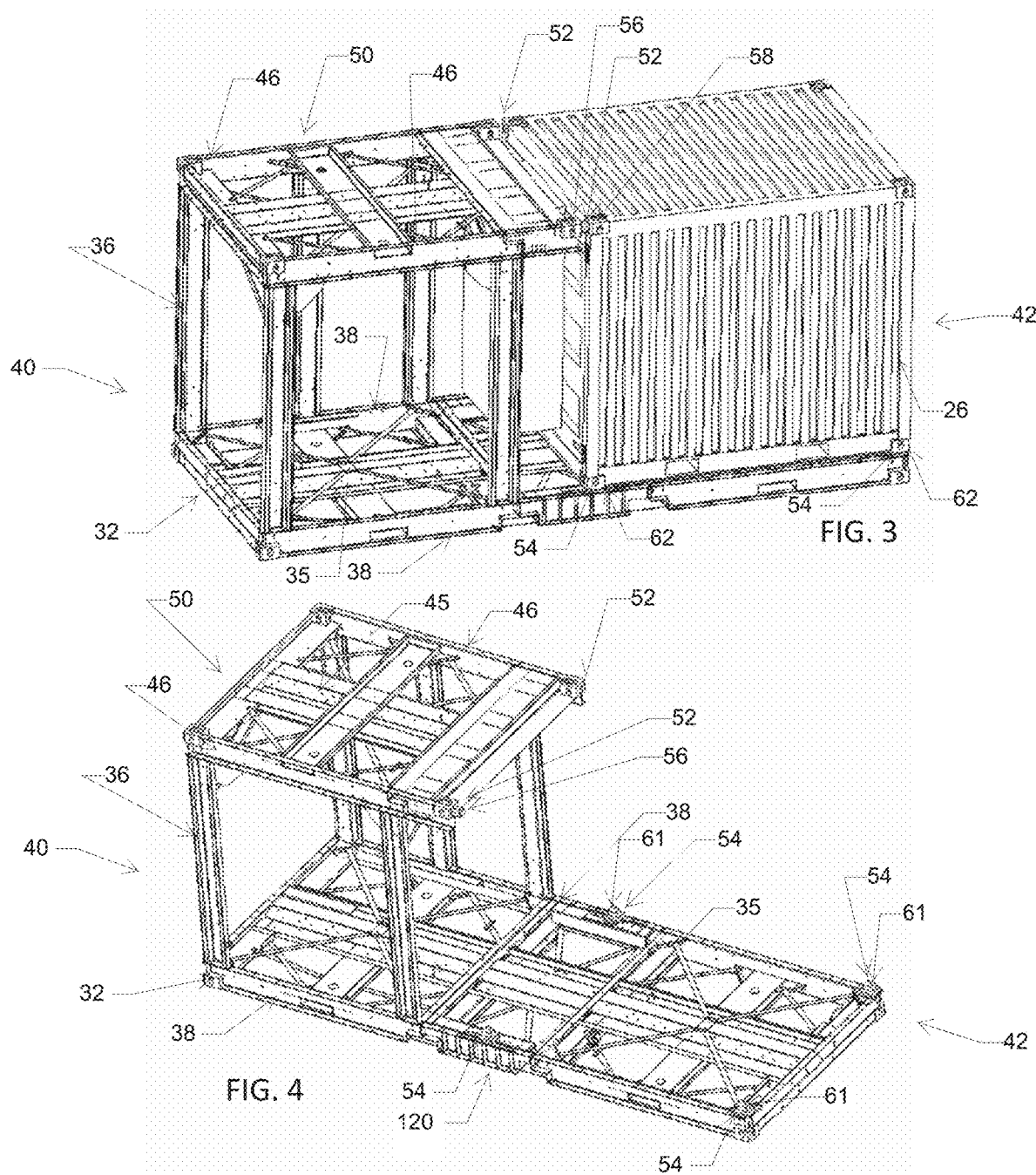

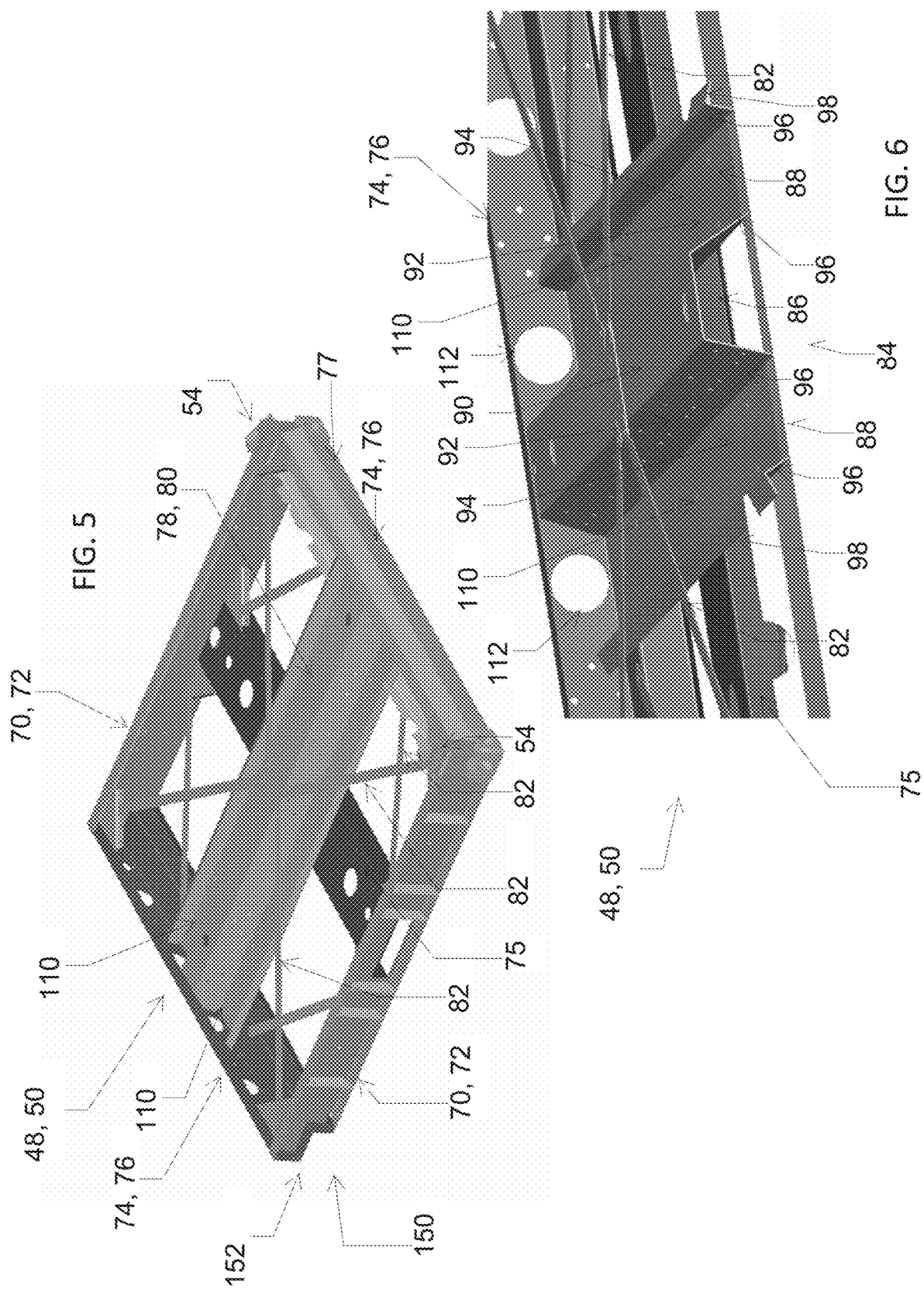

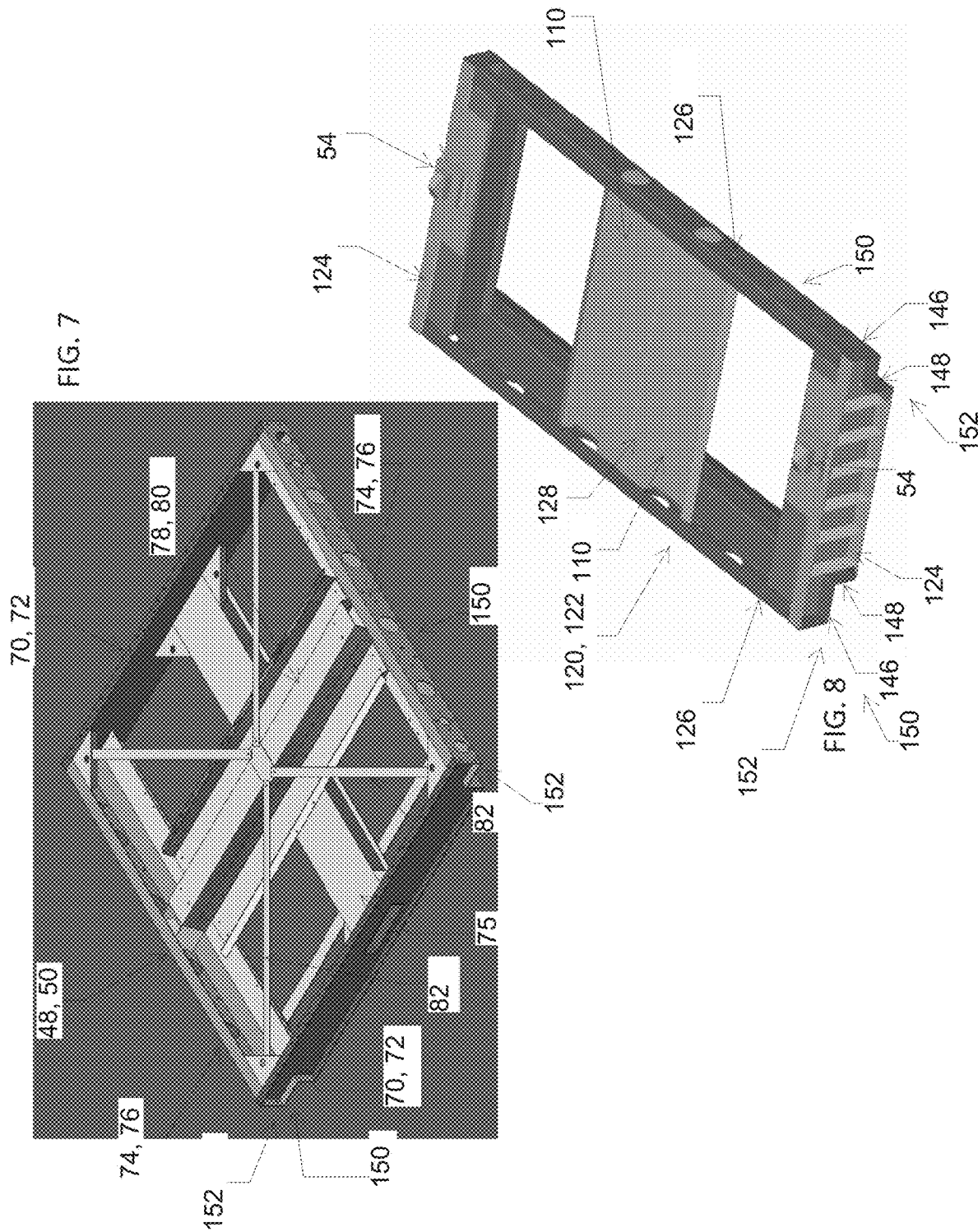

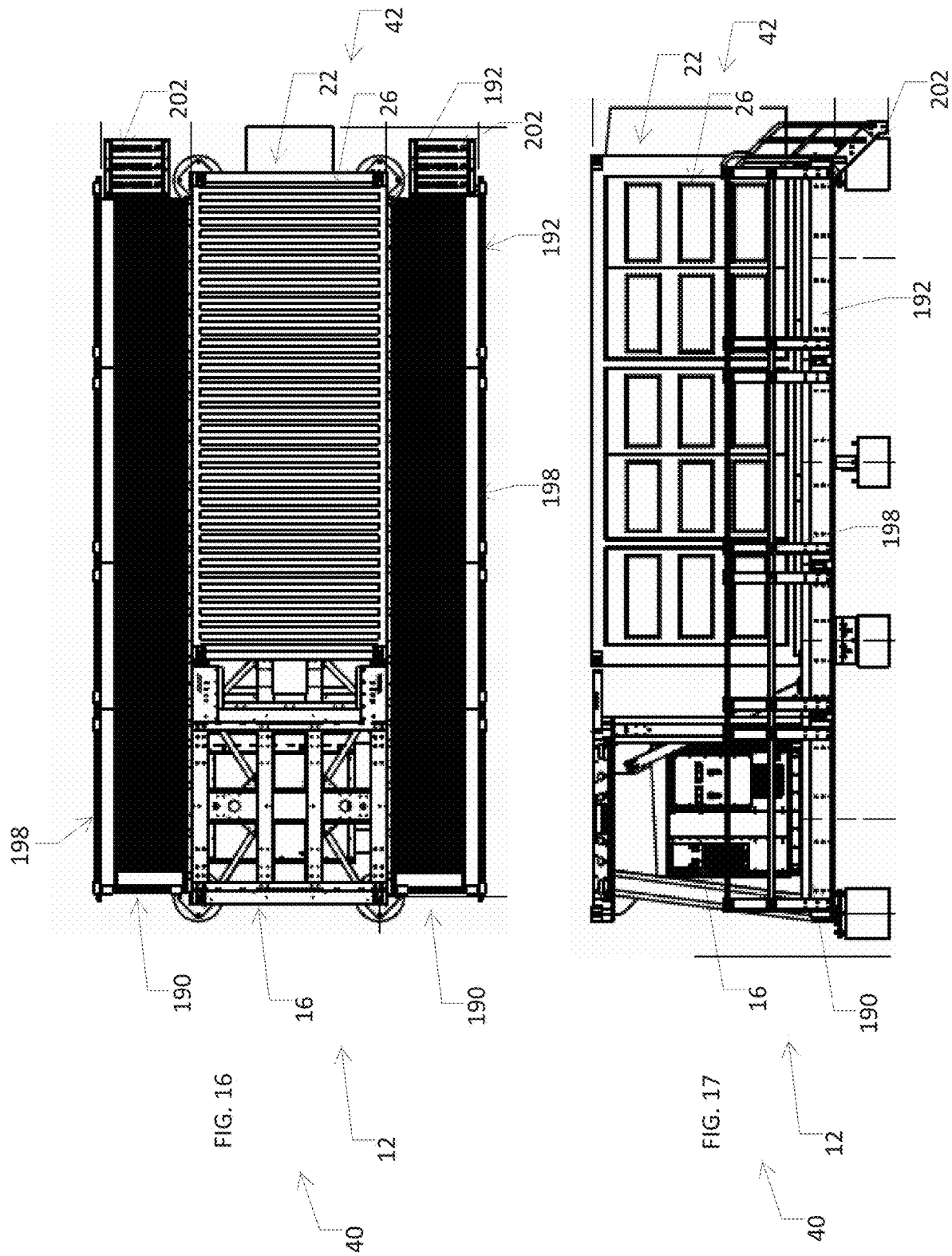

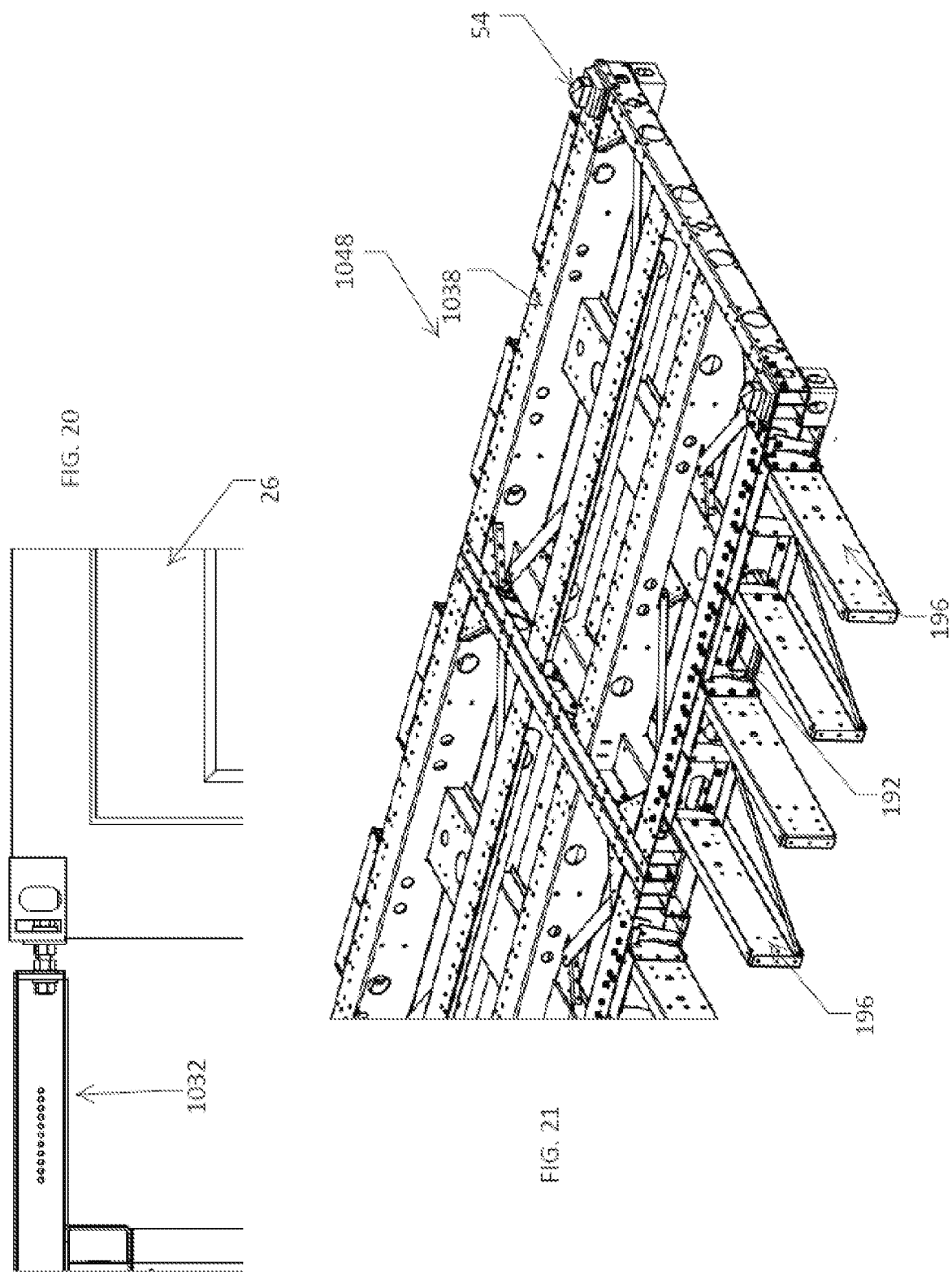

PLATFORM MICROGRID

CROSS-REFERENCE TO RELATED APPLICATION

This utility patent application claims the benefit of priority from U.S. Provisional Application No. 63/194,964, entitled "PLATFORM MICROGRID," filed on May 29, 2021, the contents of which are hereby incorporated by reference herein in their entirety.

FIELD

The present disclosure is directed to electric power systems, and more particularly, to microgrid electric power systems.

SUMMARY

The present application discloses one or more of the features recited in the appended claims and/or the following features which, alone or in any combination, may comprise patentable subject matter.

According to one aspect of the present disclosure, a platform microgrid system may include a platform skid including support structure for mounting of microgrid system equipment; a microgrid control system supported by the platform skid, the microgrid control system comprising microgrid system equipment for conducting microgrid operations including at least one processor for executing instructions stored in memory, and microgrid circuitry for facilitating microgrid operations according to the processor; and a power delivery system. The power delivery system may be supported by the platform skid. The power delivery system may be arranged in communication with the microgrid control system to provide electrical power to a load bus.

In some embodiments, the power delivery system may include a power storage device. The power storage device may be configured to provide electric power to the load bus according to the microgrid control system. The power delivery system may include an inverter system for converting DC power to AC power for communication to the load bus.

In some embodiments, the power delivery system may include a photovoltaic (PV) terminal for connection with a PV system for receiving DC electric power input to the power delivery system. At least a portion of the PV system may be mounted to the platform skid for generating power from sunlight.

In some embodiments, the power storage device may be housed within an intermodal container. The intermodal container may be connected with the platform skid. The intermodal container may be integrated with the support structure of the platform skid.

In some embodiments, the support structure of the platform skid may include a number of intermodal container locks configured for integral connection with the intermodal container as a structural component of the platform skid. The number of intermodal container locks may include one or more lateral intermodal container locks. Each lateral intermodal container lock may comprise complementary portions of the support structure and the intermodal container. One of the complementary portions may include a lateral member for insertion into a receiver of the other one of the complementary portions.

In some embodiments, the complementary portions of support structure of the horizontal intermodal container locks may be formed on an upper section of the support structure. The number of intermodal container locks may include one or more vertical intermodal container locks. Each vertical intermodal container lock may comprise complementary portions of the support structure and the intermodal container. One of the complementary portions may include a vertical member for insertion into a receiver of the other one of the complementary portions.

In some embodiments, the complementary portions of support structure of the vertical intermodal container locks may be formed on a lower section of the support structure. The support structure of platform skid may include a lower section including a number of longitudinal base members extending along the longitudinal dimension of the platform skid. The number of longitudinal base members may be joined together by a number of cross members.

In some embodiments, the number of longitudinal base members may be defined by one or more modular support members. Each modular support member may define a segmented portion of the lower section of the support structure for joining with adjacent modular support members. Each modular support member may comprise a number of base member segments. Each base member segment may define a segment of the corresponding longitudinal base member. Each modular section may comprise a number of lateral members extending between the number of base member segments. The number of lateral members may extend between and connect at least two of base member segments.

In some embodiments, the lower section may include a support spine extending along the longitudinal dimension of the platform skid. The support spine may define a torsional reinforcement member to resist bending. The support spine may be formed with a profile including a base member and wings extending from opposite sides of the base member.

In some embodiments, the support spine may define at least one cable channel extending longitudinally therethrough for routing cabling. The base member may be formed with a trapezoidal outline and the wings extend from sides legs of the outline. Each wing may be formed with a trapezoidal outline having a side leg joined with the side leg of the base member. In some embodiments, the support spine may be arranged centrally along a lateral extent of the lower section.

In some embodiments, the number of longitudinal base members may be defined by one or more modular support members. Each modular support member may comprise at least one support spine segment defining a segment of the support spine. Each at least one support spine segment may define a torsional reinforcement member segment to resist bending. In some embodiments, the least one support spine segment may define a portion of at least one cable channel extending longitudinally therethrough for routing cabling.

In some embodiments, the lower section of the support structure may include a number of intermodal container locks selectively connectible at various positions along the longitudinal base members to accommodate variation in the size of a mounted intermodal container. The number of intermodal container locks may include a base plate selectively connectible at various positions to a reinforcement member having a plurality of fastener receivers for accommodating the various positions of the intermodal container locks along the longitudinal base members to accommodate variation in the size of a mounted intermodal container.

In some embodiments, the microgrid control system may comprise a power conditioning system (PCS) for governing power provided to the load bus from the power delivery system. The PCS may be configured to govern at least one of frequency, voltage, and power factor on the load bus. The load bus may include an electric vehicle charging station for providing DC power charging to electric vehicles. The electric vehicle charging station may be supported by the platform skid.

According to another aspect of the present disclosure, a platform microgrid system may comprise a platform skid for mounting of microgrid system equipment; and a microgrid operations system. The microgrid operations system may include a microgrid control system supported by the platform skid. The microgrid control system may comprise microgrid system equipment for conducting microgrid operations including at least one processor for executing instructions stored in memory, and microgrid circuitry for facilitating microgrid operations according to the processor. The platform microgrid system may include a power delivery system supported by the platform skid. The power delivery system may be arranged in communication with the microgrid control system to provide electrical power to a load bus. In some embodiments, the platform skid may include an intermodal container housing a power storage device in communication to provide power to the power delivery system.

In some embodiments, the power storage device may be configured to provide electric power to the load bus according to the microgrid control system. The power delivery system may include an inverter system for converting DC power to AC power for communication to the load bus. The power delivery system may include a photovoltaic (PV) terminal for connection with a PV system for receiving DC electric power input to the power delivery system. In some embodiments, at least a portion of the PV system may be supported by the platform skid for generating power from sunlight.

In some embodiments, the intermodal container may be integrated as a portion of support structure of the platform skid. The support structure of the platform skid may include a number of intermodal container locks may be configured for integral connection with the intermodal container as a structural component of the platform skid. The number of intermodal container locks may include one or more lateral intermodal container locks. Each lateral intermodal container lock may comprise complementary portions of the support structure and the intermodal container. One of the complementary portions may include a lateral member for insertion into a receiver of the other one of the complementary portions.

In some embodiments, the complementary portions of support structure of the horizontal intermodal container locks may be formed on an upper section of the support structure. The number of intermodal container locks may include one or more vertical intermodal container locks. Each vertical intermodal container lock may comprise complementary portions of the support structure and the intermodal container. One of the complementary portions may include a vertical member for insertion into a receiver of the other one of the complementary portions.

In some embodiments, the complementary portions of support structure of the vertical intermodal container locks may be formed on a lower section of the support structure. A support structure of platform skid may include a lower section including a number of longitudinal base members extending along the longitudinal dimension of the platform skid. The number of longitudinal base members may be joined together by a number of cross members.

In some embodiments, the number of longitudinal base members may be defined by one or more modular support members. Each modular support member may define a segmented portion of the lower section of the support structure for joining with adjacent modular support members. Each modular support member may comprise a number of base member segments. Each base member segment may define a segment of the corresponding longitudinal base member. Each modular support member may include a number of lateral members extending between the number of base member segments. In some embodiments, the number of lateral members may extend between and connect at least two of base member segments.

In some embodiments, the lower section may include a support spine extending along the longitudinal dimension of the platform skid. The support spine may define a torsional reinforcement member to resist bending. The support spine may be formed with a profile including a base member and wings extending from opposite sides of the base member. The support spine may define at least one cable channel extending longitudinally therethrough for routing cabling.

In some embodiments, the base member may be formed with a trapezoidal outline and the wings extend from sides legs of the outline. Each wing may be formed with a trapezoidal outline having a side leg joined with the side leg of the base member. The support spine may be arranged centrally along a lateral extent of the lower section.

In some embodiments, the number of longitudinal base members may be defined by one or more modular support members. Each modular support member may comprise at least one support spine segment defining a segment of the support spine. The at least one support spine segment may define a torsional reinforcement member segment to resist bending.

In some embodiments, the at least one support spine segment may define a portion of at least one cable channel extending longitudinally therethrough for routing cabling. The lower section of the support structure may include a number of intermodal container locks selectively connectible at various positions along the longitudinal base members to accommodate variation in the size of a mounted intermodal container. In some embodiments, the number of intermodal container locks may include a base plate selectively connectible at various positions to a reinforcement member having a plurality of fastener receivers for accommodating the various positions of the intermodal container locks along the longitudinal base members to accommodate variation in the size of a mounted intermodal container.

In some embodiments, the microgrid control system may comprise a power conditioning system (PCS) for governing power provided to the load bus from the power delivery system. The PCS may be configured to govern at least one of frequency, voltage, and power factor on the load bus. The load bus may include an electric vehicle charging station for providing DC power charging to electric vehicles. The electric vehicle charging station may be supported by the platform microgrid. In some embodiments, the charging station may be supported entirely by the platform microgrid.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

A more complete understanding of disclosed embodiments and the utility thereof may be acquired by referring to the following description in consideration of the accompanying drawings, in which like reference numbers indicate like features, and wherein:

FIG. 2 is a perspective view of the platform microgrid system of FIG. 1 according to disclosed embodiments, having certain structure omitted for illustrative ease;

FIG. 3 is a perspective view of the platform microgrid system of FIGS. 1 and 2 according to disclosed embodiments, having certain structure omitted for illustrative ease;

FIG. 4 is a perspective view of the platform microgrid system of FIGS. 1-3 according to disclosed embodiments, having certain structure omitted for illustrative ease;

FIG. 5 is a perspective view of a modular section of support structure of the platform microgrid system of FIGS. 1-4 according to disclosed embodiments;

FIG. 6 is a close perspective view of portions of the modular section as shown in FIG. 5 of support structure of the platform microgrid system of FIGS. 1-5 according to disclosed embodiments;

FIG. 7 is a perspective view of a modular section of support structure of the platform microgrid system of FIGS. 1-6 according to disclosed embodiments;

FIG. 8 is a perspective view of a modular section of support structure of the platform microgrid system of FIGS. 1-7 according to disclosed embodiments;

FIG. 16 is a top plan view of the platform microgrid system of FIG. 15;

FIG. 17 is a side elevation view of the platform microgrid system of FIGS. 15-16;

FIG. 20 is a partial side elevation view of the platform microgrid system of FIGS. 15-19 showing a connection between the support structure and the integrated power storage housing; and FIG. 21 is a perspective view of the platform microgrid system of FIGS. 15-20 showing a portion of the support structure for supporting the catwalks.

DETAILED DESCRIPTION OF THE DRAWINGS

Figure 1:
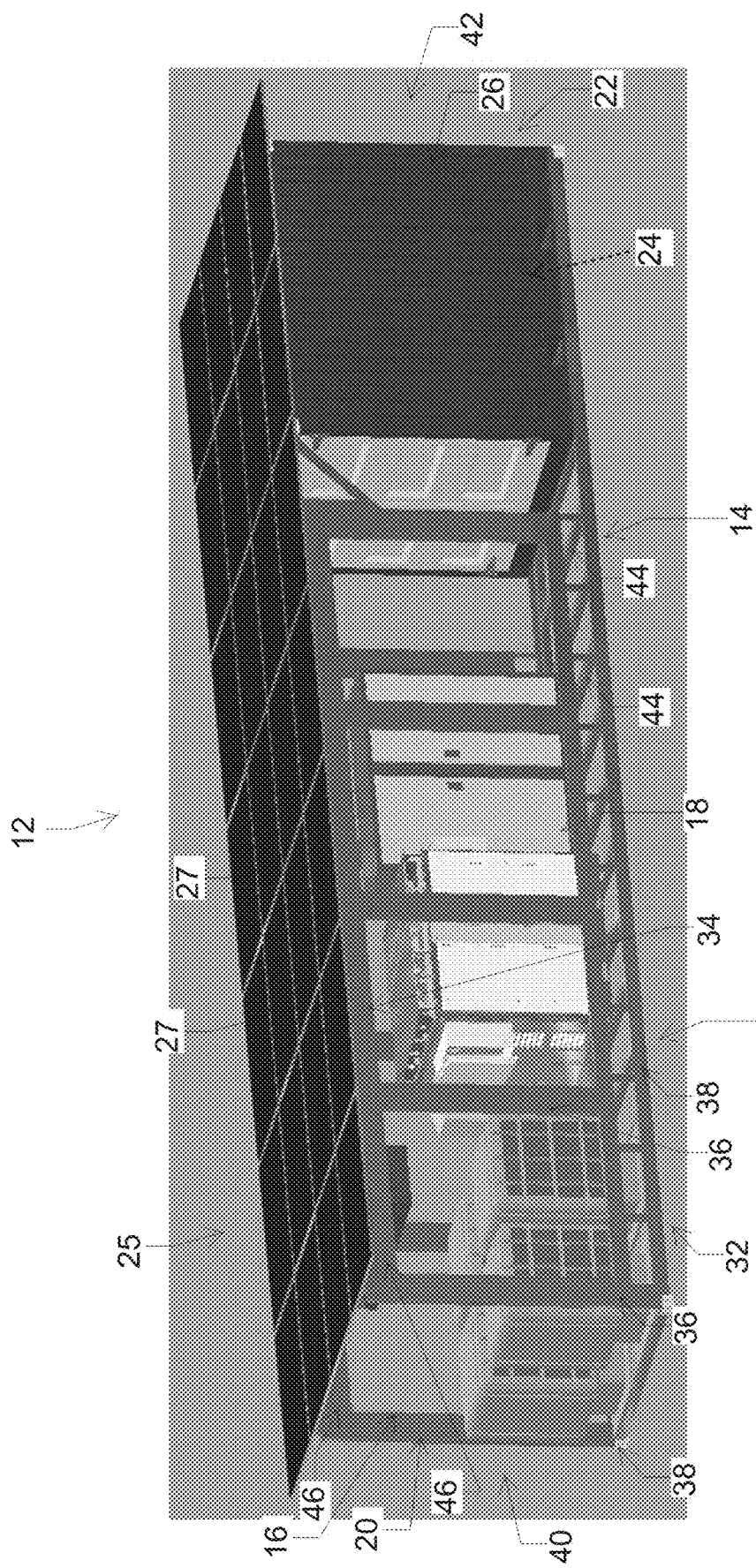
FIG. 1 is a perspective view of platform microgrid system according to disclosed embodiments.

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and further applications of the principles of the disclosure which would normally occur to one skilled in the art to which the disclosure relates. Unless otherwise indicated, the components in the drawings are shown proportional to each other.

Localized electric power grids, for example, microgrids (or nano-grids) can provide reliable power to areas otherwise lacking substantial infrastructure, or needing additional robustness in power service. However, even traditional microgrids can require a complex integration of components which can be challenging to implement. Additionally, implementing microgrids within more remote areas, for example, less-developed regions which may lack support resources, can emphasize these existing challenges and/or can pose additional challenges to microgrid installation, operation, and/or maintenance.

Among these challenges are the various logistics issues for microgrid establishment. For example, large equipment of the microgrid, including microgrid control equipment, can require extensive use of machine lifts (e.g., cranes, loaders), installation of one or more foundations, such as a concrete foundations, with specific engineering to support the loads for each individual piece of equipment to be integrated in microgrid operations. Additionally, equipment must be integrated and/or commissioned together to communicate between power control and power providing equipment to conduct microgrid operations. However, field integration and/or commissioning of such equipment can pose challenges of time, access, and/or skill, and such challenges can persist throughout the useful lifetime of the equipment. Once again, such challenges can be exacerbated by remote locations.

Referring to FIG. 1, a platform microgrid system 12 is shown to support microgrid operations. As discussed in detail herein, the platform microgrid system 12 includes a platform skid 14 providing structural support for microgrid system equipment. The platform microgrid system 12 can provide a prefabricated microgrid control and supply package, reducing the intensity of field installation, integration, and/or commissioning efforts. The platform microgrid system 12, thus, can reduce many of the challenges to quickly and reliably implementing microgrids in remote areas and/or to establishing autonomous and/or semi-autonomous additions to available infrastructure. Additionally, the platform microgrid system 12 can assist in integrating and/or deploying renewable energy solutions facing similar issues as mentioned above.

The platform microgrid system 12 includes a microgrid operations system 16 comprising governing equipment for control and supply of microgrid power. The microgrid operations system 16 is supported by the platform skid 14 providing an integrated platform and operations system with high degree of pre-fabrication. The microgrid operations system 16 includes a microgrid control system 18 for governing microgrid operations and a power delivery system 20 for providing microgrid power to one or more load bus according to the microgrid control system 18.

As shown in FIG. 1, the platform microgrid system 12 includes a power storage system 22 comprising a power storage device 24 housed within a power storage housing 26. In the illustrative embodiment, the power storage device 24 is formed as a battery, but in some embodiments may be formed to include any manner of power storage for supplying electrical power. The power storage housing 26 is illustratively formed as an intermodal container, for example, an International Organization for Standardization (ISO) container. Such intermodal containers are typically formed with rigid walls integrated with a structural frame having standard dimensions. For example, intermodal containers can have lengths of 20, 30, or 40 ft, with width and height of 8 ft by 8.5 ft, although imperial intermodal containers may have heights of 9.5 ft. In some instances, intermodal container dimensions may vary in accordance with acceptable tolerance as discussed in additional detail herein. In some embodiments, the power storage housing 26 may be formed by any suitable container, whether selectively isolatable from the support structure 28 or not, may be omitted, and/or defined apart from and/or unsupported by the platform skid 14. In the illustrative embodiment, the power storage system 22, and namely the power storage housing 26, is illustratively embodied as integrated with the platform skid 14.

As shown in FIG. 1, the platform skid 14 includes support structure 28 for mounting of microgrid system equipment. The support structure 28 is illustratively defined by various structural members, embodied as steel frame supports. The power storage system 22 is integrated into the support structure 28, as a part of the support structure 28, to provide continuous structural integrity.

The support structure 28 includes a lower section 32 and upper section 34. A number of vertical supports 36 extend between the lower and upper sections 32, 34. Collectively, the lower section 32, upper section 34, and vertical supports 36 define a base support structure for connection with the power storage housing 26 of the power storage system 22 to define structure of the platform skid 14.

The lower section 32 includes a pair of base members 38 extending longitudinally between ends 40, 42 of the platform skid 14. A number members 44 extend laterally between the base members 38 to join the base members 38 together. The power storage housing 26 is supported by the lower section 32 on top of the base members 38. The upper section 34 includes a pair of base members 46 extending longitudinally between ends 40, 42 of the platform skid 14. A number cross members extend between the base members 46 to join the base members of the upper section 34 together. The power storage housing 26 is connected with the upper section 34. As discussed in additional detail herein, the power storage housing 26 can be locked with the upper and lower sections 32, 34 integrated to bear loads (e.g., static and/or dynamic loads, such as from installed loadings, installation loadings, and/or shipping loadings) as part of the support structure 28.

The platform microgrid system 12 illustratively includes a photo-voltaic (PV) array 25. The PV array 25 includes a number of PV cells 27 arranged to generate DC electric power directly from sunlight. As discussed in additional detail herein, the PV array 25 is arranged in communication with the microgrid operations system 16 via a PV terminal connection to provide electric power. The PV array 25 is illustratively mounted on the support structure 28.

Referring to FIG. 2, the support structure 28 is shown having the vertical supports 36 and many PV cells 27 removed for ease of description. In the illustrative embodiment, the power delivery system 20 includes two of electric vehicle charging terminals 60. The electric vehicle charging terminals 60 are each configured for connection with an electric vehicle to provide DC vehicle charging. The electric vehicle charging terminals 60 are illustratively secured with the support structure 28 of the platform microgrid system 12. With the electric vehicle charging terminals 60, the platform microgrid system 12 can provide high performance electric vehicle charging to areas lacking resources. For example, the platform microgrid system 12 when equipped with the electric vehicle charging terminals 60 can be placed into remote areas otherwise having insufficient grid infrastructure to support rapid expansion of electric vehicles.

Moreover, the platform microgrid system 12 equipped with the electric vehicle charging terminals 60 can provide a self-contained electric vehicle charging platform which can immediately provide electric vehicle charging without the need for complex and/or expensive integration with existing infrastructure. For example, the PV array 25 can provide immediate power for charging the power storage device 24. Thus, even in developed regions having sufficient electric power grid infrastructure, the platform microgrid system 12 can provide standalone electric vehicle charging. Additionally, as discussed in additional detail herein, the platform microgrid system 12 can be implemented in communication with other electric power resources, such as other electric power grids and/or gen-sets.

Still referring to FIG. 2, the lower section 32 is shown having modular form, defined by a number of modular sections 48, 120. The upper section 34 is shown having modular form, defined by a number of modular sections 50, 122. The modular sections 48, 50 each define a segmented portion of the corresponding lower and upper section 32, 34 for joining together with adjacent modular sections 48, 50 to define the lower and upper sections 32, 34, respectively.

The power storage housing 26 is illustratively connected with the support structure via lock assemblies 52, 54. The locks assemblies 52, 54 are each illustratively embodied as intermodal container locks or ISO container locks and receivers. One non-limiting example of a suitable container lock includes a twistlock as marketed by Sea Box, Inc. of Cinnaminson, N.J. and complementary receiver.

The lower section 32 includes a support spine 35 extending longitudinally along the platform skid 14. The support spine 35 illustratively defines a torsional reinforcement member to resist bending in the support structure 28. The upper section 34 includes a support spine 45 extending longitudinally along the platform skid 14. The support spine 45 illustratively defines a torsional reinforcement member to resist bending in the support structure 28. In some embodiments, one of the lower section 32 and upper section 34 may include the support spine 35, 45, and the other of the lower and upper sections 32, 34 may omit its support spine 35, 45.

Referring to FIGS. 3 and 4, the lock assemblies 52 are illustratively arranged as horizontal lock assemblies. The lock assemblies 52 each include a lock member 56 embodied as a male component arranged on one of the upper section 34 and the power storage housing 26, and a receiver member 58 embodied as a female receptacle arranged on the other of the upper section 34 and the power storage housing 26 for receiving the lock member 56. In the illustrative embodiment, the lock member 56 extends horizontally from the upper section 34 for engagement with the receiver member 58 on the power storage housing 26. While engaged with the receiver member 58, the lock member 56 can be operated between locked and unlocked positions to selectively lock connection between the upper section 34 and the power storage housing 26.

The lock assemblies 54 are illustratively arranged as vertical lock assemblies. The lock assemblies 52 each include a lock member 61 embodied as a male component arranged on one of the lower section 32 and the power storage housing 26, and a receiver member 62 embodied as a female receptacle arranged on the other of the lower section 32 and the power storage housing 26 for receiving the lock member 61. In the illustrative embodiment, the lock member 61 extends vertically from the lower section 32 for engagement with the receiver member 62 on the power storage housing 26. While engaged with the receiver member 62, the lock member 61 can be operated between locked and unlocked positions to selectively lock connection between the upper section 34 and the power storage housing 26.

Referring now to FIGS. 5 & 7, a modular section 48, 50 is shown in isolation for descriptive ease. In the illustrative embodiment, the modular sections 48, 50 for the lower and upper sections 32, 34 are similar to each other, but in some embodiments, may be formed with different underlying members and/or structure. The modular section 48 includes a pair of longitudinal segments 70, each defining a portion of the respective base member 38. The modular section 50 includes a pair of longitudinal segments 72 defining a portion of the respective base member 46. When the modular sections 48, 50 are joined with adjacent modular sections 48, 50, the longitudinal segments 70, 72 of the collective modular sections 48, 50 collectively define the base members 38, 46 of the support structure 28. The modular section 48 in FIG. 5 is shown including an end member 77 secured with the one lateral member 74 as a terminal end of the skid 14, compared with the modular section 48 of FIG. 7 which omits the end member 77.

Each modular section 48, 50 includes lateral members 74, 76. Each modular section 48 includes a pair of lateral members 74 extending between the segments 70 to connect the segments 70 together. The lateral members 74 are illustratively arranged orthogonally to segments 70. Each modular section 50 includes a pair of lateral members 76 extending between the segments 72 to connect the segments 72 together. The lateral members 76 are illustratively arranged orthogonally to segments 72.

A lateral member 75 illustratively extends between longitudinal segments 70, 72. The lateral member 75 is illustratively arranged centrally between the lateral members 74 on the modular section 48. The lateral member 75 is illustratively arranged centrally between the lateral members 76 on the modular section 50.

Each modular section 48 includes a support spine segment 78. Each support spine segment 78 illustratively extends between the lateral members 74 to provide support to the modular section 48. When the modular sections 48 are joined with adjacent modular sections 48, the support spine segment 78 of the collective modular sections 48 collectively define the support spine 35 to provide torsional support, for example, twisting about the longitudinal axis, and/or bending along the longitudinal axis.

Each modular section 50 includes a support spine segment 80. Each support spine segment 80 illustratively extends between the lateral members 76 to provide support to the modular section 50. When the modular sections 50 are joined with adjacent modular sections 50, the support spine segment 80 of the collective modular sections 50 collectively define the support spine 45 to provide torsional support, for example, twisting about the longitudinal axis, and/or bending along the longitudinal axis.

The modular sections 48, 50 illustratively include cross-ties 82. Cross-ties 82 are illustratively arranged to extend diagonally across the respective modular section 48, 50. Some cross-ties 82 illustratively connect between the support spine segment 78, 80 and at least one of the lateral members 74, 76 and the longitudinal segments 70, 72. Other cross-ties connect between the lateral members 74, 76 and the longitudinal segments 70, 72 or the lateral member 75.

Referring to FIG. 6, the modular section 48, 50 is shown having one lateral member 74, 76 removed to reveal a cross-sectional profile 84 of the support spine segment 78, 80. The cross-sectional profile 84 is generally formed by the support spine segment 78, 80 having a base portion 86 and wing portions 88 extending from lateral sides of the base portion 86. The base portion 86 is illustratively defined to have a trapezoidally shaped contour including a base 90 and side legs 92 extending from the base 90. The wings portions 88 illustratively extend laterally outward from an end of the side legs 92. Each wing portion 88 is illustratively defined to have a trapezoidally shaped contour including a base 94 and side legs 96 extending from the base 94. In the illustrative embodiment, the side leg 96 connected with the base portion 86 is formed to overlap with the corresponding side leg 92; however, in some embodiments, the proximal side leg 96 may be omitted and the base 94 may be joined directly with the base portion 86. The side leg 96 distal from the base portion 86 illustratively includes an extension 98 projecting therefrom.

Each support spine segment 78 defines at least one cable channel segment 110. In the illustrative embodiment, each support spine segment 78 defines one cable channel segment 110 on either lateral side of the base portion 86. Each cable channel segment 110 is aligned with an opening 112 in each lateral member 74, 76 to permit cabling to extend therethrough. When the modular sections 48, 50 are joined with adjacent modular sections 48, 50, the cable channel segments 110 collectively define cable channels to provide for extension of cabling along the longitudinal direction of the support structure 28.

Referring to FIG. 8, the modular sections 120, 122 are shown as similarly formed. The modular sections 120, 122 illustratively define different longitudinal length than the modular sections 48, 50, and can assist in accommodating microgrid platform skid 14 to include different dimensions of power storage housing 26, for example, different sizes of intermodal containers. The modular sections 120, 122 can be applied (or omitted) together with modular sections 48, 50 to collectively define different lengths of microgrid platform skid 114.

The modular section 120, 122 illustratively include longitudinal segments 124 which combine with other longitudinal segments 70, 72, 124 of other modular sections 48, 50, 120, 122 to collectively define the longitudinal base members 38, 46 of the lower and upper sections 32, 34. Each modular section 120, 122 includes lateral members 126 extending between the longitudinal segments 124. Each modular section 120, 122 illustratively includes a support spine segment 128. The support spine segment 128 extends between the lateral members 126, and is formed with cross-sectional profile similar to support spine segment 78, 80 of the modular sections 48, 50.

Referring still to FIG. 8, the modular section 120 of the lower section 32 includes the lock assembly 54, whereas in the illustrative embodiment of the upper section 34, the lock assembly 54 is omitted and, depending on the length configuration of the skid 14, the lock assembly 52 may be applied. In the illustrative embodiment of the modular section 120, the lock assembly 54 is applied as a portion of a positionable lock assembly 130 operable between a variety of positions to accommodate power storage housings 26 having different size.

Figure 9:
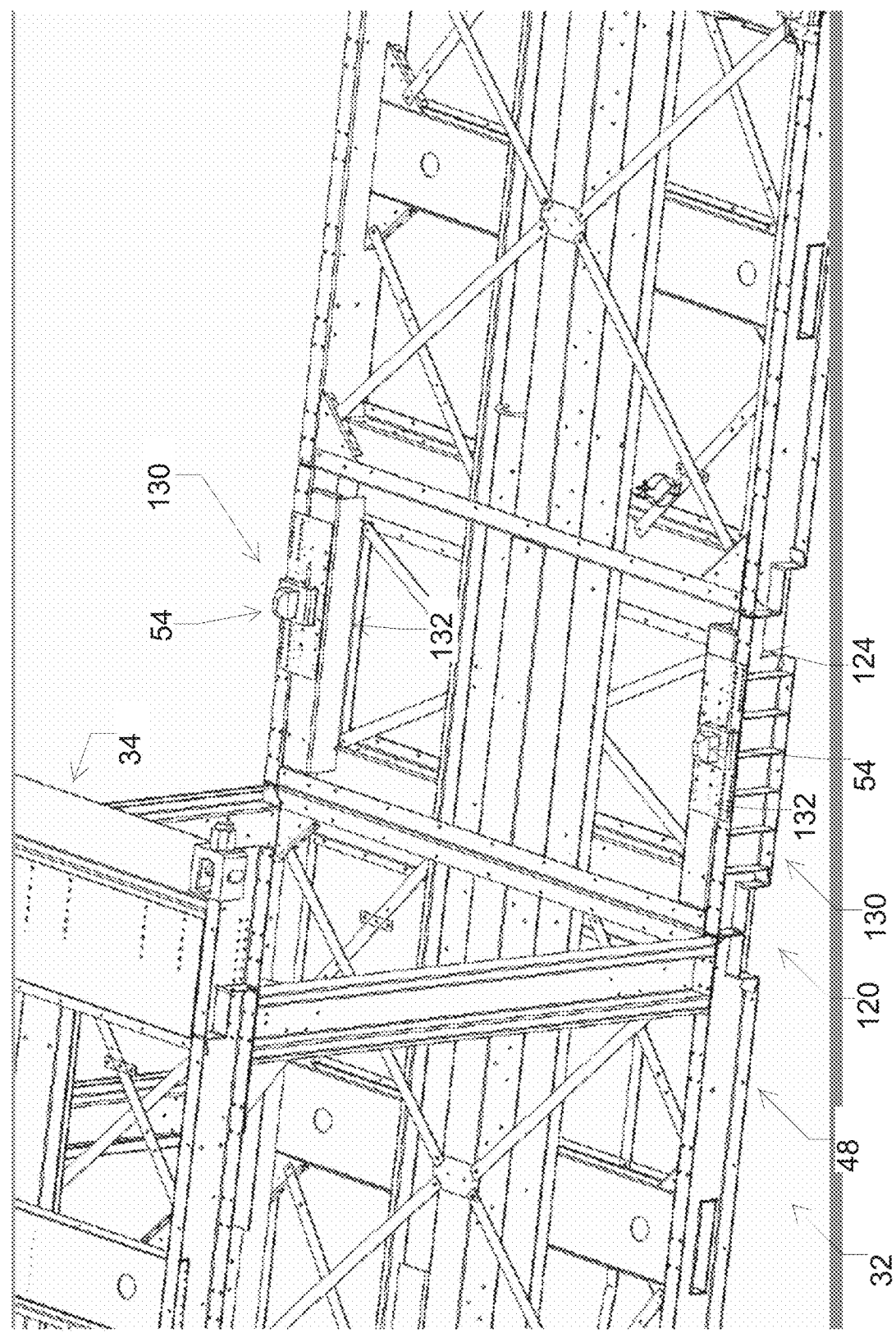
FIG. 9 is a perspective view of portions of the support structure of the platform microgrid system of FIGS. 1-8 according to disclosed embodiments.

Referring now to FIG. 9, the positionable lock assembly 130 includes a mounting plate 132 connected with the modular section 120 and adapted for selective connection with the lock assembly 54 at a number of positions to accommodate various sizes of power storage housing 26. The positionable lock assembly 130 includes the mounting plate 132 secured with the modular section 120. The mounting plate 132 is illustrative secured with the longitudinal segment 124. The mounting plate 132 illustratively includes a number of mounting holes defined therethrough for receiving fasteners of the lock assembly 54 in various positions. For example, the mounting plate 132 illustratively includes a set of mounting holes for mounting the lock assembly 54 at a position corresponding to a power storage housing 26 having an exact longitudinal dimension (e.g., 20 ft) and one or more other sets of mounting holes for mounting the lock assembly 54 at another position corresponding to a power storage housing 26 having a longitudinal dimension +/−0.75 inches (e.g., 19.25 inches, 20.75 inches, etc.). In the illustrative embodiment, the one or more other sets of mounting holes are arranged incrementally based on intermodal container standard tolerance and/or deviation in the longitudinal and/or lateral dimensions, but in some embodiments, may be arranged at positions corresponding to any manner of tolerance and/or deviation of power storage housing 26 dimension. Although the positionable lock assembly 130 is shown connected with the modular section 120, the positionable lock assembly 130 may be connected with any modular section 48, 50, 120, 122.

Figure 10:
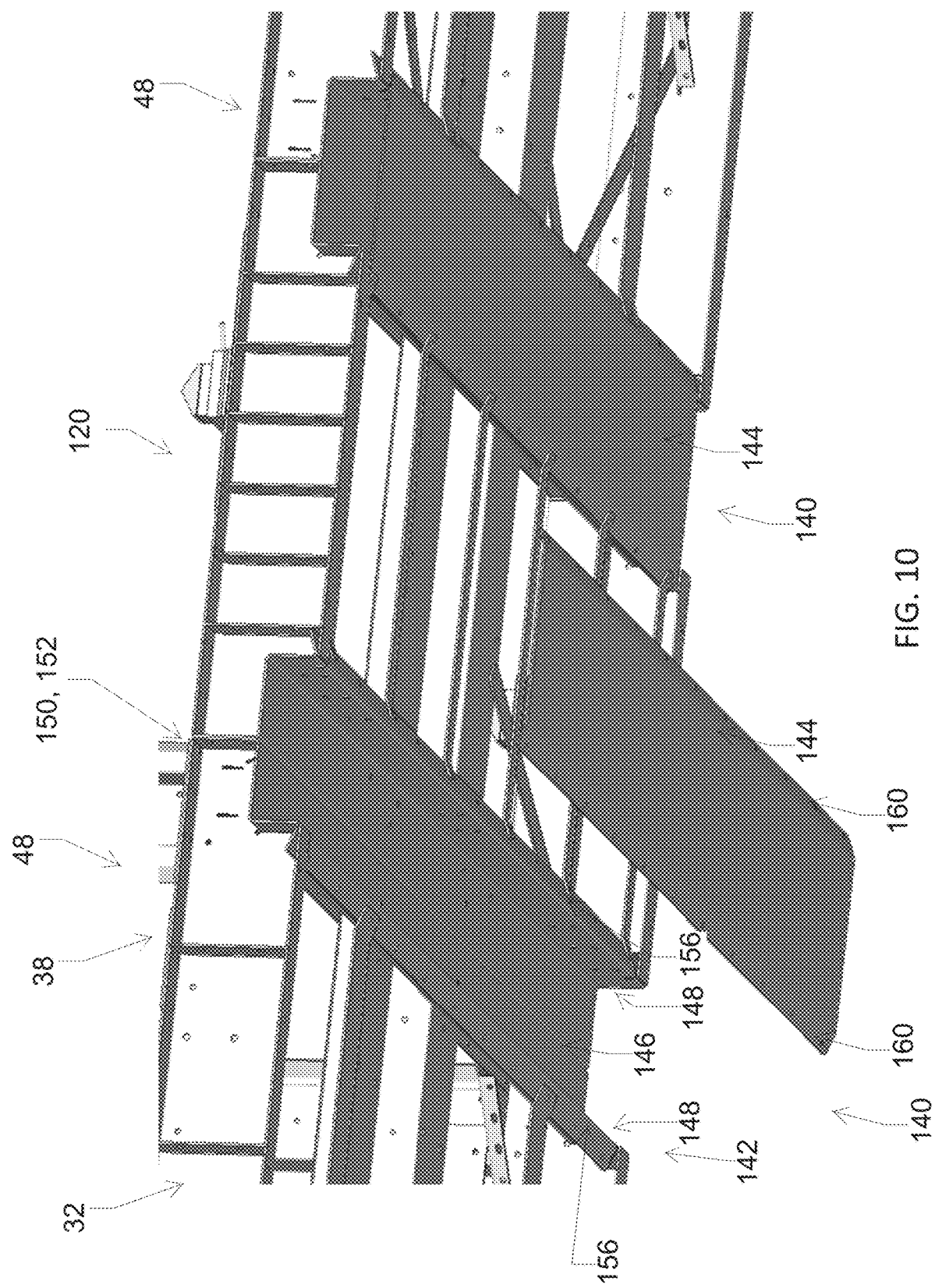
FIG. 10 is a perspective view of portions of the support structure of the platform microgrid system of FIGS. 1-9 according to disclosed embodiments.

Referring now to FIG. 10, a connection system 140 of the platform microgrid system 12 is shown for joining adjacent modular sections 48, 50, 120, 122. The connection system 140 illustratively includes a connection body 142 and a plate 144 connection with the body 142. For purposes of description, adjacent modular sections 48 and 120 are shown, but the connection system 140 can apply equally to any adjacent modular sections 48, 50, 120, 122. As discussed in additional detail below, the connection body 142 is illustratively defined collectively by portions of the adjacent modular sections 48, 120. The connection body 142 and the plate 144 collectively form a tensile member which defines the lower and/or upper sections 32, 34 to resist bending.

The connection body 142 includes a base 146 having arms 148. The base 146 is illustratively defined collectively by portions of each of the adjacent modular sections 48, 120. Referring briefly to FIGS. 7 and 8, the modular sections 48, 120 each define stepped longitudinal ends 150. Namely, the lateral members 74, 126 are each formed to define a stepped, L-shaped cross-section having one portion of the base 146 and one arm 148 extending from the base 146. The longitudinal segments 70, 124 each include longitudinal ends 152 form complementary to the longitudinal ends 150.

Returning now to FIG. 10, each connection body 142 is defined collectively by the adjacent longitudinal ends 150 of the adjacent modular sections 48, 120. The longitudinal ends 150 of the segments 70, 124 of the modular sections 48, 120 form a concave shape including the base 146 and arms 148 on opposite longitudinal sides of the base 146. An extension 156 projects from each of the arms 148 in the longitudinal direction. Each extension 156 is flared from horizontal to angle upwards (in the orientation of FIG. 10). For example, each extension can be flared upwards by angle within the range of about 1 to about 20 degrees.

Each plate 144 includes a base 158 and arms 160. The base 158 is illustratively defined as a generally flat portion extending along the lateral direction of the skid 14. The arms 160 extend from opposite longitudinal sides of the base 158. The arms 160 are each defined as flared extensions formed complementary to the extensions 156 of the connection body 142. The plate 144 is joined with the connection body 142 by complementary engagement and connection of the arms 160 and extensions 156, illustratively by bolted connection through each of the corresponding extension 156 and arm 160. The connection body and plate 142, 144 when joined together define a tensile structure having geometric profile along the lateral direction of the skid 14 to resist bending. As previously mentioned, although details regarding the connection system 140 have been described in terms of the example using modular sections 48, 120, the connection system 140 can be applied with any pair of adjacent modular sections 48, 50, 120, 122 to assist in defining the collective support structure 28.

Figure 11:
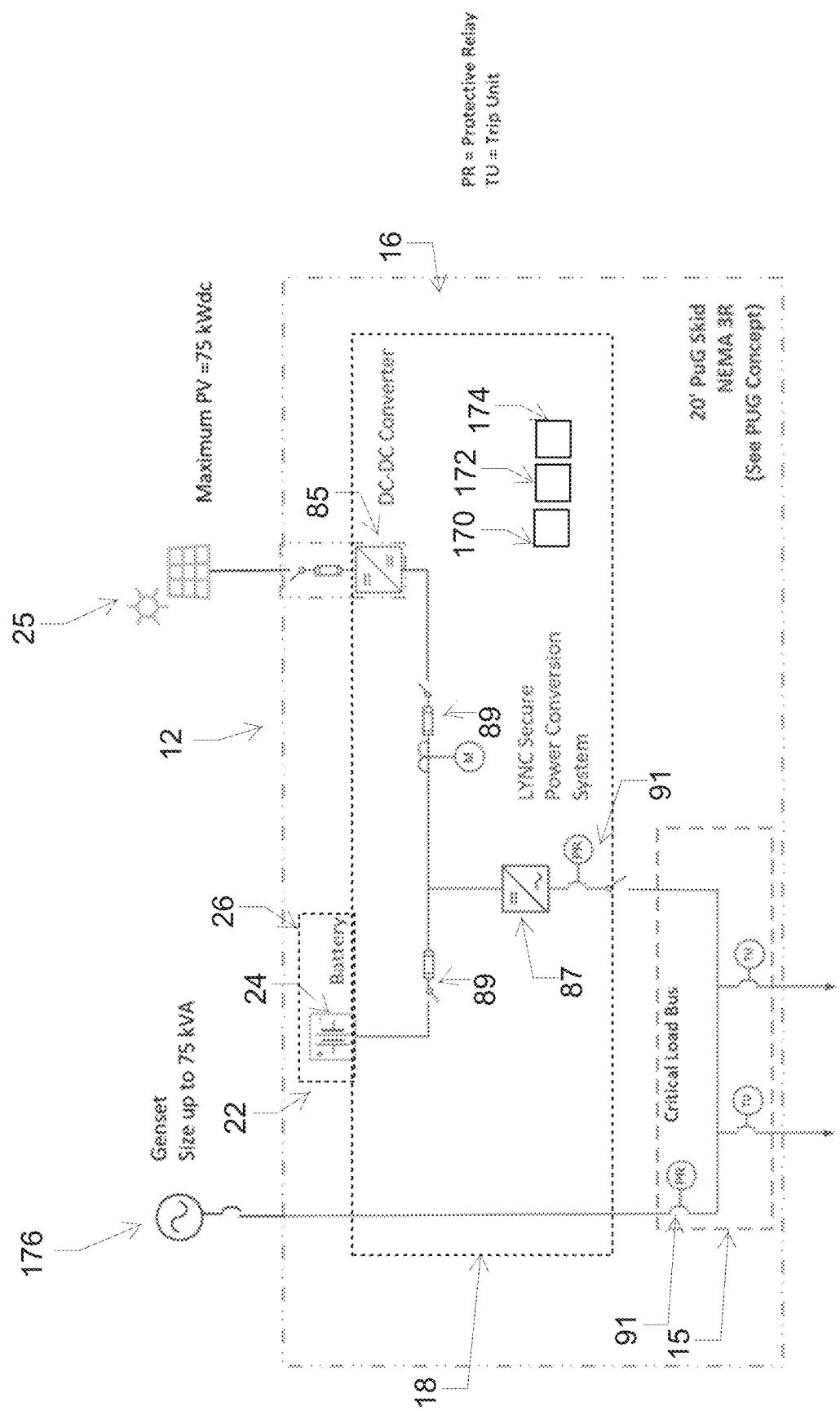
FIG. 11 is a diagrammatic view of the platform microgrid system of FIGS. 1-10 according to disclosed embodiments.

Referring now to FIG. 11 an illustrative arrangement of the microgrid operations system 16 is shown including the microgrid control system 18 in communication with a PV array 25 to provide charging power for the power storage device 24. The microgrid control system 18 illustratively includes a power conditioning system (PCS) for governing electric power provided to the load bus 15, an energy management system (EMS) for governing electric power to/from the power storage device 24, and a power management system (PMS) for governing AC power to and/or from the load bus 15. The microgrid control system 18 illustratively includes related auxiliaries, for example, switching circuitry panels for isolation and/or control (e.g., switchgear), converters/inverters (e.g., DC-DC converter 85, DC-AC converter/inverter 87), disconnects (e.g., disconnect with contactors 89) trip units (e.g., trip unit 93), associated motors, relays (e.g., protective relay 91), wiring/bus service, instrumentation, and/or sensors, among other things to support its disclosed operations.

Portions of the microgrid control system 18, for example but without limitation, the EMS and/or PMS, may be formed partly or wholly virtually by operation of the processor 170 as discussed in additional detail herein. The PCS includes configuration for microgrid power routing and/or maintenance, for example, maintaining desirable frequency, voltage, power factor, real and/or or reactive power of the microgrid. One non-limiting example of a suitable PCS includes a LYNC Secure power conversion system as marketed by Go Electric, Inc. of Anderson Ind. Other information regarding examples of suitable microgrid PCS technologies can be found within U.S. Patent Application Publication Nos. 2019/0386581 and 2019/0044335, filed on Jun. 18, 2019 and Jul. 31, 2018, respectively, the contents of each of which are hereby incorporated by reference, including but without limitation, those portions concerning microgrid operations.

The microgrid control system 18 illustratively includes a processor 170, memory 172, and communication circuitry 174. The processor 170 executes instructions stored on memory 172, and communicates signals via communication circuitry 174, with portions of the platform microgrid system 12 and/or external systems. Although illustrated as single devices sharing resources for various portions of microgrid operations, the microgrid control system 18 may include any suitable number and/or configuration processor, memory, and/or communication circuitry for governing operations, whether dedicated or partly/wholly shared by sub-systems. Examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry may include suitable components for facilitating processor operations, for example, suitable components may include transmitters, receivers, modulators, demodulators, filters, modems, analog/digital (AD or DA) converters, diodes, switches, operational amplifiers, and/or integrated circuits.

As shown in FIG. 11, the platform microgrid system 12 is arranged in communication with a genset 176. The genset 176 is illustratively embodied as a traditional electric power generator, such as a diesel generator, combustion turbine-generator, and/or expansion turbine-generator, providing 3-phase 480V AC service with an exemplary rating of about 75 kVA, but in some embodiments, may include any suitable manner of baseline electric power including but not limited to AC/DC, voltage, phase, and/or rating. The genset 176 incorporated with the platform microgrid system 12 can provide additional reliability for microgrid operation governed by the microgrid control system 18. The microgrid control system 18 may be operated to charge the power storage device 24 only by PV array 25 and to selectively provide suitable electric power to the load bus 15 from one or more of the power storage device 24 and/or the genset 176 as available and/or required; or may be operated to selectively charge the power storage device 24 via the genset 176 when the PV array 25 is unavailable, undesirable, and/or incapable of suitably charging the power storage device 24, and to selectively provide power to the load bus 15 from one or more of the power storage device 24 and the genset 176 as desired. The PV array 25 is illustratively embodied for an exemplary rating of about 75 kW of DC power, but in some embodiments, may include any suitable arrangement of local renewable power including but not limited to AC/DC, voltage, phase, and/or rating. Non-limiting examples of suitable microgrid operational ratings within the present disclosure can include a rating within the range of about 20 kVA to about 1 MVA.

The load bus 15 is illustratively shown in FIG. 11 to provide 3-phase, 60 Hz, 480V AC microgrid power service, governed by the microgrid control system 18. However, in some embodiments, the load bus may include any suitable manner of microgrid electric power, including but without limitation, AC power, and/or DC power such as for DC charging terminals 60. Accordingly, microgrid control system 18 can provide appropriate microgrid commutation, switching, maintenance, monitoring, and/or other governance for operating the microgrid.

Figure 12:
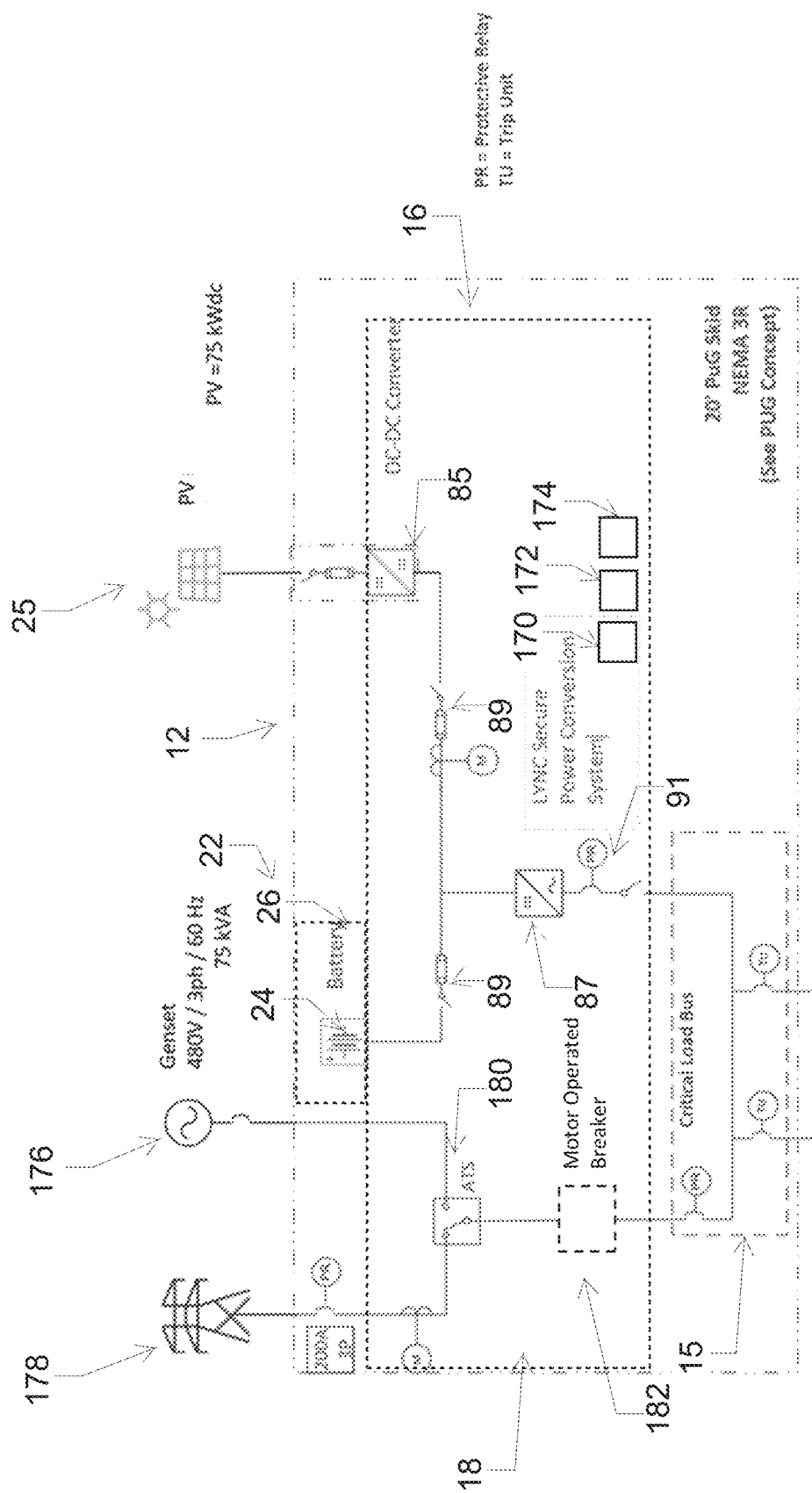
FIG. 12 is a diagrammatic view of the platform microgrid system of FIGS. 1-11 according to disclosed embodiments.

Referring now to FIG. 12, the platform microgrid system 12 is shown arranged in communication with a power grid 178. The power grid 178 is embodied as a local infrastructure AC power grid. The power grid 178 may be a reliable grid, for example, a utility maintained electric power grid of a developed region, or may represent a less reliable grid, such as a local grid of an undeveloped region. The microgrid control system 18 can manage power of the platform microgrid system 12 in coordination from the power grid 178, genset 176, power storage device 24, and/or PV array 25. The microgrid control system 18 may be operated to charge the power storage device 24 only by PV array 25 and to provide suitable electric power to the load bus 15 from one or more of the power storage device 24, the genset 176, and/or the power grid 178 as available and/or required; or may be operated to selectively charge the power storage device 24 via the genset 176, and/or power grid 178, when the PV array 25 is unavailable or incapable of suitably charging the power storage device 24. The microgrid control system 18 can apportion power from one or more of the power storage device 24, genset 176, and power grid 178 to the load bus 15, as needed for microgrid operations.

The platform microgrid system 12 may be operated, according to the microgrid control system 18, to preferably provide power from the power storage device 24. The platform microgrid system 12 may be operated to rely on the genset 176 and/or power grid 178, only as needed according to availability of suitable power from the power storage device 24, for example, to increase renewable and/or autonomous energy supply. In some instances, the microgrid control system 18 may operate the power storage device 24 as an backup power source, conserving at least a portion of stored power for periods of unavailability (and/or undesirability) of genset 176 and/or power grid 178.

As suggested in FIG. 12, the microgrid control system 18 may include a transfer switch 180 operable to switch the AC power source between the power grid 178 and genset 176 as desired according to microgrid operations. The transfer switch 180 is illustratively embodied as an automatic power transfer switch operable to selectively provide power from one of the genset 176 and the power grid 178. The microgrid control system 18 can determined operational parameters of the microgrid, for example, at the load bus 15, and can operate the transfer switch 180 to appropriately transfer power, for example, according to the phase of the microgrid. The microgrid control system 18 illustratively includes a breaker 182, embodied as a motor-operated breaker for governing AC power provided relative to the platform microgrid system 12.

Figure 13:
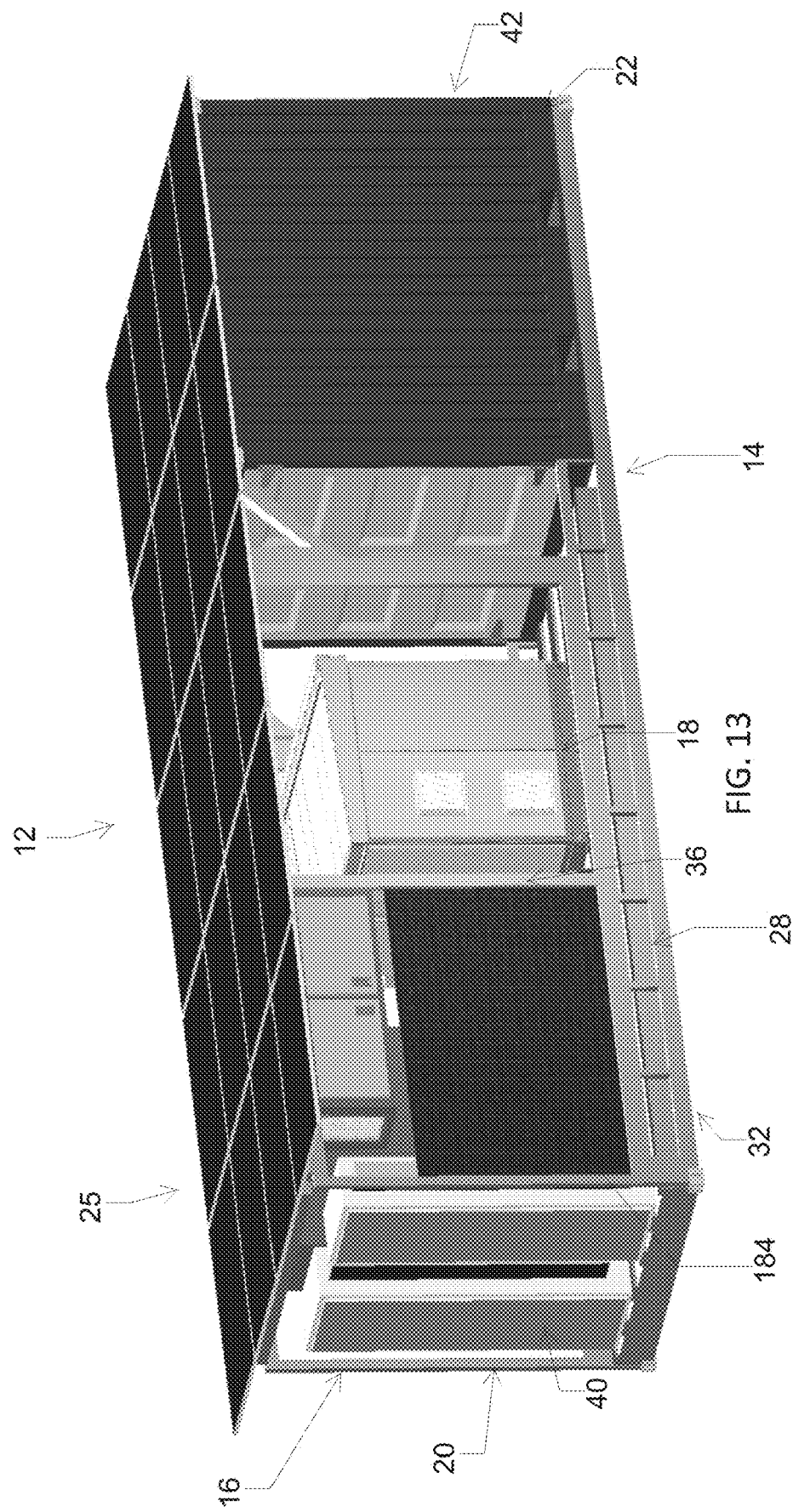
FIG. 13 is a perspective view the platform microgrid system of FIGS. 1-12 according to disclosed embodiments.

Referring now to FIG. 13, the platform microgrid system 12 is shown including fencing 184 partially enclosing the support structure 28. The fencing 184 is illustratively embodied as aesthetic, security fencing for securing the platform microgrid system 12 against access to the hardware. The fencing 184 can be attached with the support structure 28 around the perimeter thereof to conceal and/or protect internals. Aesthetically pleasing fencing may be selected to avoid the intrusiveness of industrial equipment in public areas.

Figure 14:
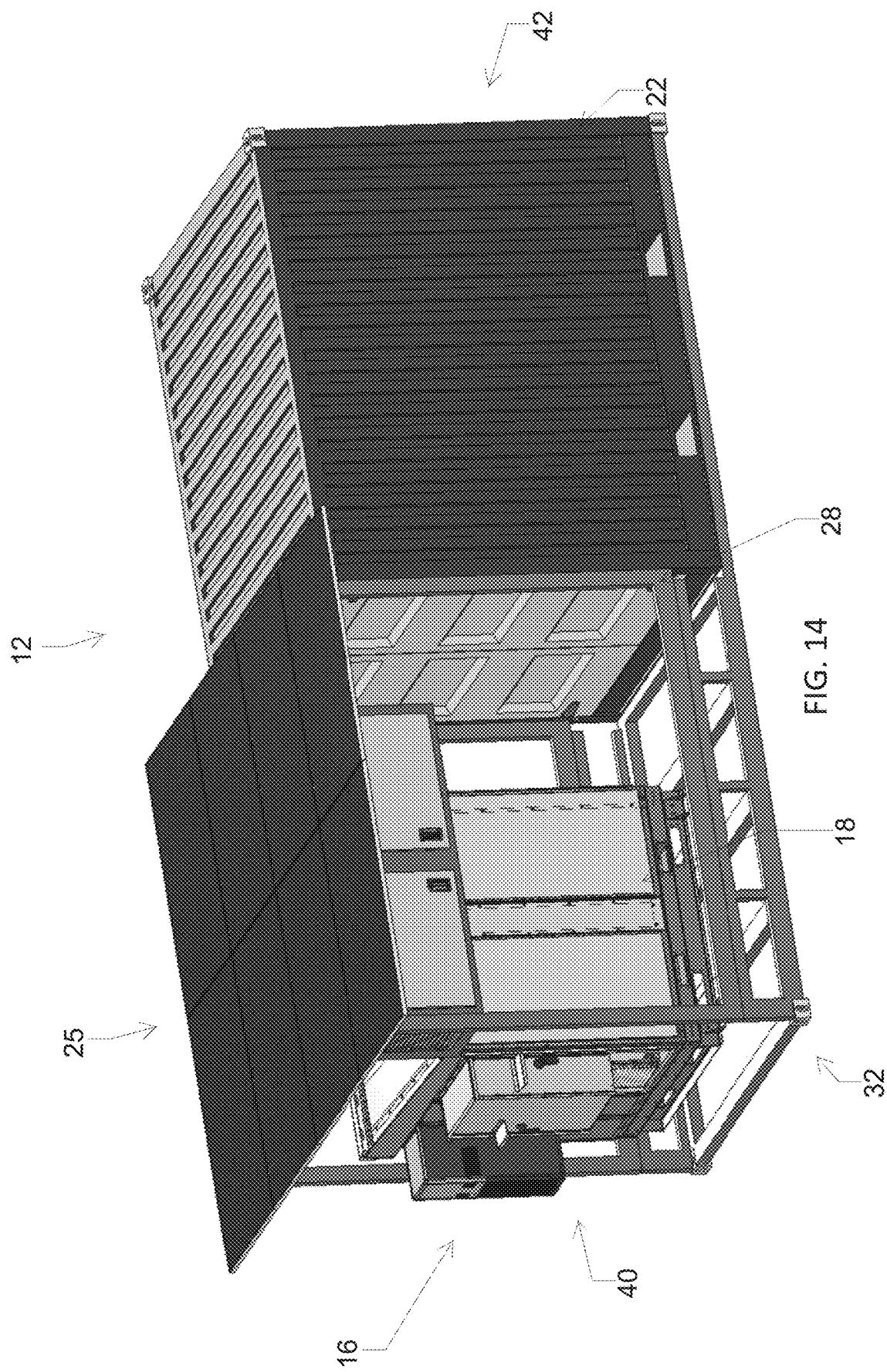
FIG. 14 is perspective view of the platform microgrid system of FIGS. 1-13 according to disclosed embodiments.

Referring to FIG. 14, the platform microgrid system 12 is shown in configuration with a non-modular support structure 28. The non-modular support structure 28 includes generally non-modular longitudinal members, as compared to the modular sections mentioned above. The power storage housing 26 is integrated as a portion of the support structure 28 via lock assemblies.

Figure 15:
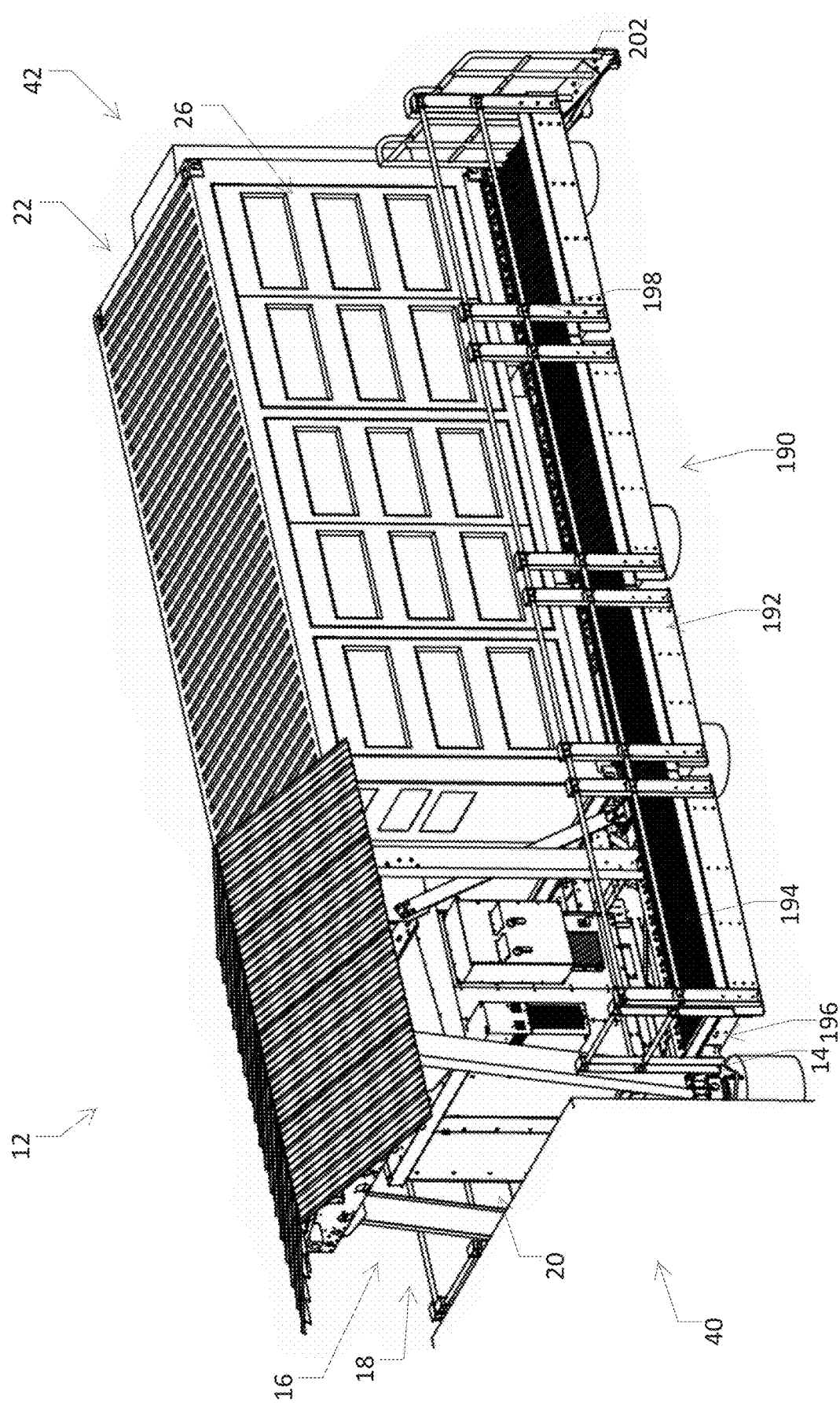
FIG. 15 is a perspective view of the platform microgrid system of FIGS. 1-14 mounted on pedestals and having catwalks for access.

Referring to FIGS. 15-17, the platform microgrid system 12 is shown including a pitched roof, and with additional supports embodied as catwalks 190 for assisting user access. The catwalks 190 are illustratively connected with the platform skid 14 and extend laterally therefrom to define a landing area 194 comprising grating for the user to walk/stand for access. One catwalk 190 is illustratively arranged on either laterally side of the platform skid 14.

Each catwalk includes a pair of longitudinal support members 192 extending longitudinally between the ends 40, 42. One longitudinal support member 192 is illustratively arranged adjacent the base member 38 of the corresponding lateral side of the platform skid 14, and the other longitudinal member 192 is spaced apart therefrom to define the landing area 194. A number of lateral members 196 (as shown in FIG. 21) extend between and connect with each of the longitudinal support members 192 of each catwalk 190 for receiving the landing area 164. Safety rails 198 and stairs 202 are illustratively secured with the outer longitudinal support members 192.

Figure 18:
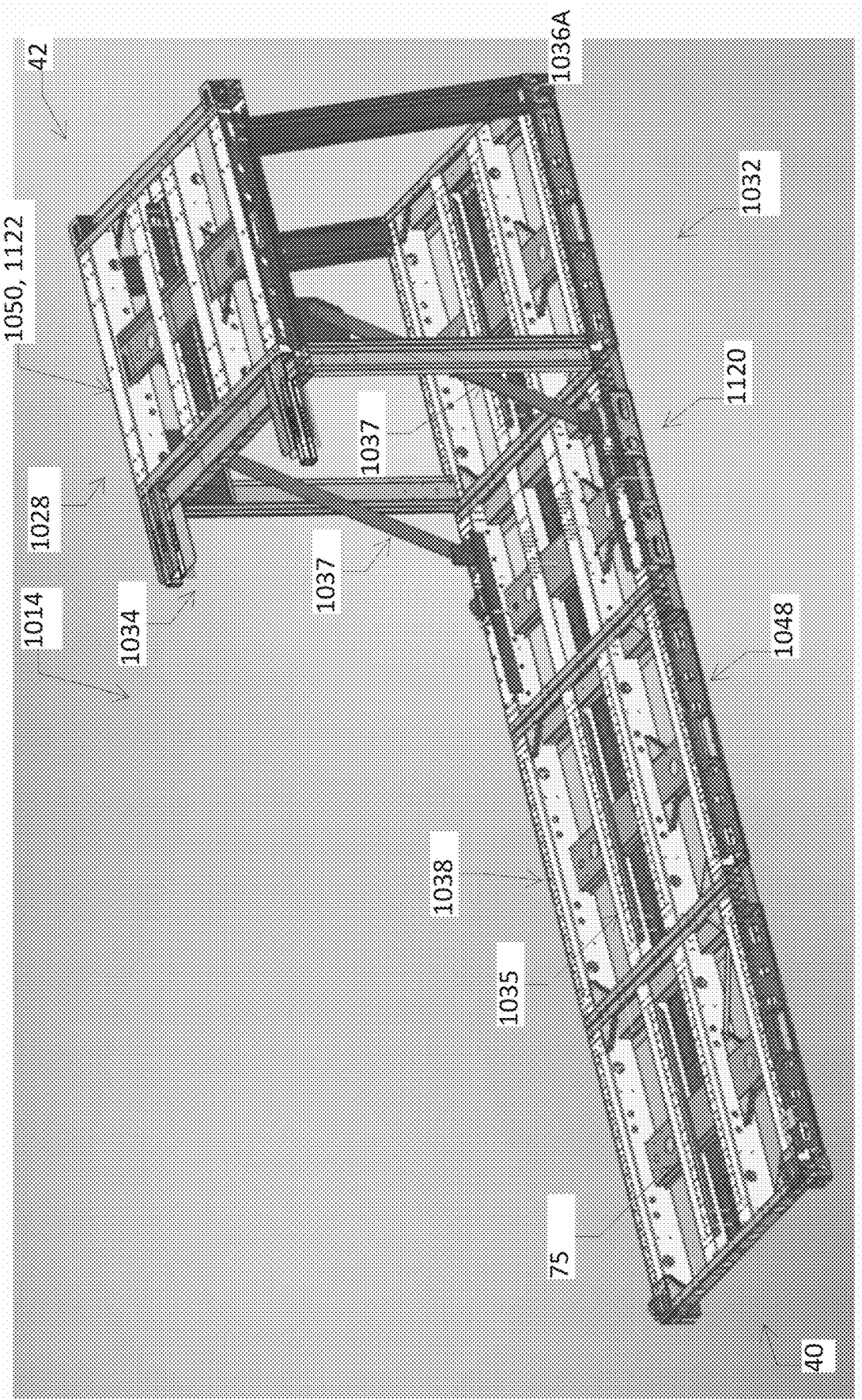
FIG. 18 is a perspective view of the platform microgrid system of FIGS. 15-17 having certain structure omitted for illustrative ease omitted to illustrate another embodiment of support structure thereof.

Referring now to FIG. 18, the platform skid 14 may be embodied as platform skid 1014, and other disclosure concerning platform skid 14 applies equally to the embodied platform skid 1014, except in instances of conflict with the specific disclosure of embodied platform skid 1014. Platform skid 1014 includes support structure 1028 illustratively defined by various structural members, embodied as steel frame supports. The power storage system 22 is integrated into the support structure 1028, as a part of the support structure 1028, to provide continuous structural integrity, although shown removed in FIG. 18 for ease of description.

The support structure 1028 includes a lower section 1032 and upper section 1034. A number of vertical supports 1036 extend between the lower and upper sections 1032, 1034, and a number of struts 1037 extend slanted (e.g., longitudinally and vertically) between the upper and lower sections 1032, 1034 to provide flex support. Collectively, the lower section 1032, upper section 1034, and vertical supports 1036 define a base support structure for connection with the power storage housing 26 of the power storage system 22 to define structure of the platform skid 1014. In the illustrative embodiment, vertical supports 1036A near the end 42 extend slanted (e.g., longitudinally and vertically) between the upper and lower sections 1032, 1034 to provide flex support. Longitudinal base members 1038 extend between the ends 40, 42, just as base members 38.

Figure 19:
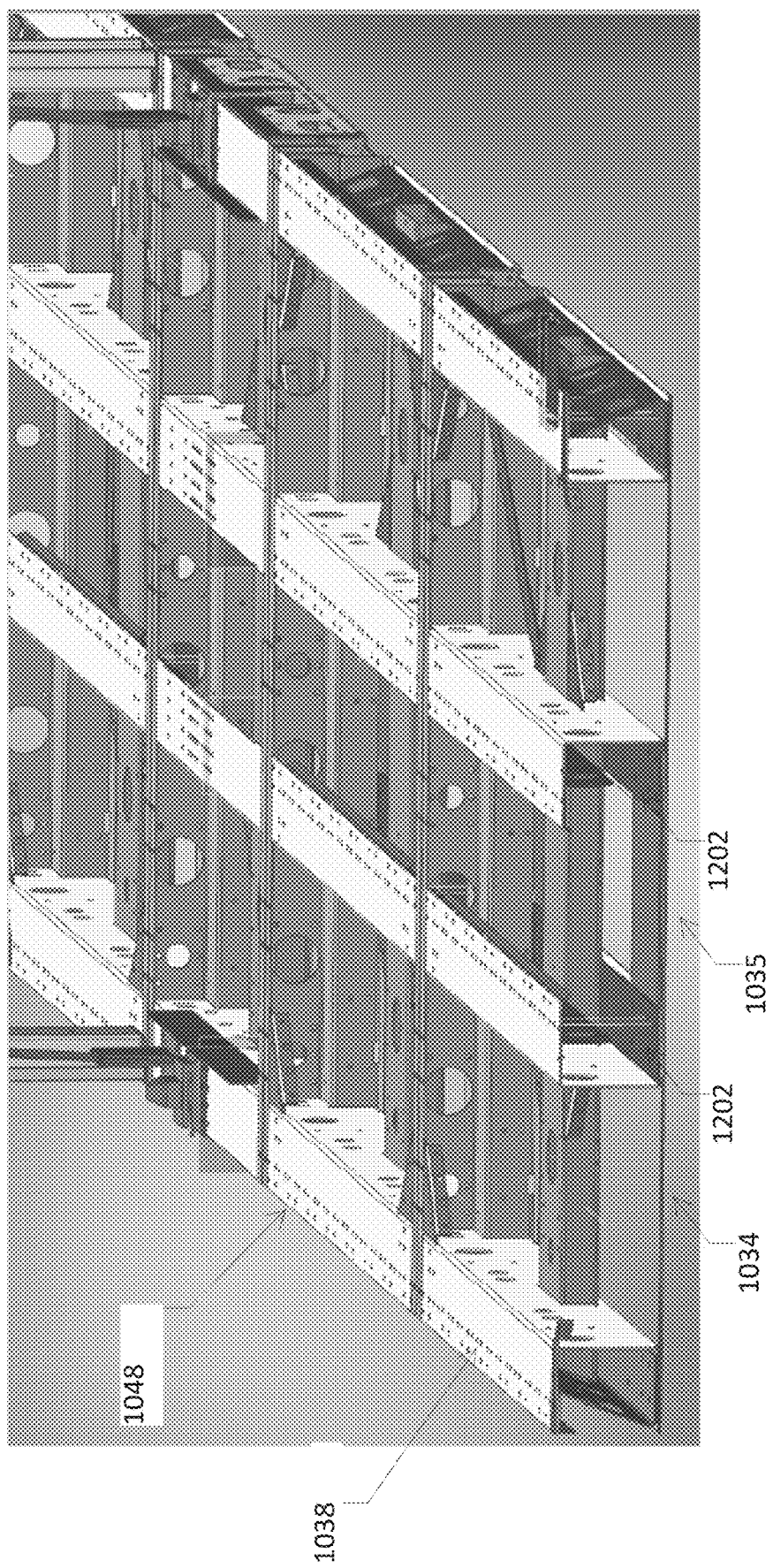
FIG. 19 is a close perspective view of the platform microgrid system of FIGS. 15-18 showing a portion of the support structure of FIG. 18.

The upper and lower sections 1032, 1034 each illustratively have modular form, selectively defined by a number of modular sections 1048, 1120, 1050, 1122 to permit variable configuration according to the demands of the particular platform microgrid system. As shown in FIG. 19, the lowers section 1034 of the support structure 1028 includes a support spine 1035 defining a longitudinal torsional support member to resist bending. In some embodiments, the upper section 1032 may include a support spine 1035.

Referring to FIG. 19, the support spine 1035 extends longitudinally through the lower section 1034. The support spine 1035 illustratively includes a pair of C-channel support members 1202 joined together by cross-supports 1204 at intervals along the longitudinal length to collectively define the support spine 1035. The C-channel support members 1202 are illustratively arranged to face each other, and are defined by modular sections corresponding with the modular sections 1048, 1120. A cable channel is defined between the support members 1202 to allow passage of cabling. In the illustrative embodiment, each modular support member comprises at least one support spine segment defining a segment of the support spine 1035.

Referring to FIG. 20, the power storage housing 26 is illustratively connected with the support structure 1028 via lock assemblies 1052, 54. The locks assemblies 1052 are embodied as threaded rod and fasteners connecting the upper section 1032 with the power storage housing 26, while the lock assemblies 54 are each illustratively embodied as intermodal container locks or ISO container locks and receivers. In some embodiments, ISO locks and threaded rod/fasteners may be used interchangeably to integrate the ISO container as a portion of the support structure.

Within the present disclosure, the microgrid platform systems, and related devices and methods, can provide uninterruptible power, energy storage, and/or microgrid controls, and can provide such service with embedded peak shaving, load shifting, and/or demand response functionalities. Such devices, systems, and methods can provide a prime generation option: solar power (and/or other renewable power, such as tidal, hydro, and/or wind), can provide fully integrated and/or pre-commissioned microgrid arrangements. Such systems 12 may accommodate ISO container footprints of 40, 30, and/or 20 feet. Such systems 12 may be pad and/or trailer mountable. Such devices, systems, and methods may implement open protocol communications.

Within the present disclosure, the microgrid platform systems, and related devices and methods, can be operated to alleviate peak demand, optimize clean energy, monetize energy resiliency during grid outage, enhance microgrid as a service (MaaS) offering, Such devices, systems, and methods can provide all-in-one microgrid, which can be portable, flexible, and/or comprehensive. Such devices, systems, and methods can make power resilience readily available in a single deliverable system, that can be flexible, cost effective, and/or quickly deployed. Such devices, systems, and methods can provide for demand response, and/or can be SCADA compatible including controls all on the utility side. Such devices, systems, and methods can provide quantifiable resilience, such that electric power users remain operational and continue utilizing PV when the grid is down. Such devices, systems, and methods can provide automated peak shaving and/or load shifting to reduce system-wide demand. Such devices, systems, and methods can allow users to easily enroll in demand response programs with reduced cost burden and/or impact on operations. Such devices, systems, and methods can provide solar energy contribution to resiliency, peak management, and/or energy efficiency, rather than, for example, de-optimizing grid operation through net-metering schemes. Such devices, systems, and methods can provide flexible deployment, applying standard ISO containers and/or can be deployed as pad mounted and/or trailer mounted based on user needs.

Although certain illustrative embodiments have been described in detail above, variations and modifications exist within the scope and spirit of this disclosure as described and as defined in the following claims.

We claim:

1. A platform microgrid system, comprising:
   a platform skid for mounting of microgrid system equipment; and
   a microgrid operations system comprising:
   a microgrid control system supported by the platform skid, the microgrid control system comprising microgrid system equipment for conducting microgrid operations including at least one processor for executing instructions stored in memory, and microgrid circuitry for facilitating microgrid operations according to the processor; and
   a power delivery system supported by the platform skid, the power delivery system arranged in communication with the microgrid control system to provide electrical power to a load bus,
   the platform skid comprising an intermodal container configured for housing a power storage device in communication to provide power to the power delivery system, wherein the intermodal container is integrated as a portion of support structure of the platform skid.

2. The platform microgrid system of claim 1, wherein the power storage device is configured to provide electric power to the load bus according to the microgrid control system.

3. The platform microgrid system of claim 2, wherein the power delivery system includes an inverter system for converting DC power to AC power for communication to the load bus.

4. The platform microgrid system of claim 1, wherein the power delivery system includes a photovoltaic (PV) terminal for connection with a PV system for receiving DC electric power input to the power delivery system.

5. The platform microgrid system of claim 4, wherein at least a portion of the PV system is supported by the platform skid for generating power from sunlight.

6. The platform microgrid system of claim 1, wherein the support structure of the platform skid includes a number of intermodal container locks configured for integral connection with the intermodal container as a structural component of the platform skid.

7. The platform microgrid system of claim 6, wherein the number of intermodal container locks includes one or more lateral intermodal container locks, each lateral intermodal container lock comprising complementary portions of the support structure and the intermodal container, wherein one of the complementary portions includes a lateral member for insertion into a receiver of the other one of the complementary portions.

8. The platform microgrid system of claim 7, wherein the complementary portions of support structure of the horizontal intermodal container locks are formed on an upper section of the support structure.

9. The platform microgrid system of claim 6, wherein the number of intermodal container locks includes one or more vertical intermodal container locks, each vertical intermodal container lock comprising complementary portions of the support structure and the intermodal container, wherein one of the complementary portions includes a vertical member for insertion into a receiver of the other one of the complementary portions.

10. The platform microgrid system of claim 9, wherein the complementary portions of support structure of the vertical intermodal container locks are formed on a lower section of the support structure.

11. The platform microgrid system of claim 1, wherein the support structure of platform skid includes a lower section including a number of longitudinal base members extending along the longitudinal dimension of the platform skid.

12. The platform microgrid system of claim 11, wherein the number of longitudinal base members are joined together by a number of cross members.

13. The platform microgrid system of claim 11, wherein the number of longitudinal base members are defined by one or more modular support members.

14. The platform microgrid system of claim 13, wherein each modular support member defines a segmented portion of the lower section of the support structure for joining with adjacent modular support members.

15. The platform microgrid system of claim 14, wherein each modular support member comprises a number of base member segments each defining a segment of the corresponding longitudinal base member, and a number of lateral members extending between the number of base member segments.

16. The platform microgrid system of claim 15, wherein the number of lateral members extend between and connect at least two of base member segments.

17. The platform microgrid system of claim 11, wherein the lower section includes a support spine extending along the longitudinal dimension of the platform skid.

18. The platform microgrid system of claim 16, wherein the support spine defines a torsional reinforcement member to resist bending.

19. The platform microgrid system of claim 16, wherein the support spine defines at least one cable channel extending longitudinally therethrough for routing cabling.

20. The platform microgrid system of claim 16, wherein the support spine is arranged centrally along a lateral extent of the lower section.

21. The platform microgrid system of claim 16, wherein the number of longitudinal base members are defined by one or more modular support members, and each modular support member comprises at least one support spine segment defining a segment of the support spine.

22. The platform microgrid system of claim 11, wherein the lower section of the support structure includes a number of intermodal container locks selectively connectible at various positions along the longitudinal base members to accommodate variation in the size of a mounted intermodal container.

23. The platform microgrid system of claim 22, wherein the number of intermodal container locks include a base plate selectively connectible at various positions to a reinforcement member having a plurality of fastener receivers for accommodating the various positions of the intermodal container locks along the longitudinal base members to accommodate variation in the size of a mounted intermodal container.

24. The platform microgrid system of claim 1, wherein the microgrid control system comprises a power conditioning system (PCS) for governing power provided to the load bus from the power delivery system.

25. The platform microgrid system of claim 24, wherein the PCS is configured to govern at least one of frequency, voltage, and power factor on the load bus.

26. The platform microgrid system of claim 1, wherein the load bus includes an electric vehicle charging station for providing DC power charging to electric vehicles.

27. The platform microgrid system of claim 26, wherein the electric vehicle charging station is supported by the platform microgrid.

* * * * *